Aug. 18, 1970  G. E. ISAKSSON ET AL  3,524,784
TIRE BUILDING MACHINE
Filed Jan. 12, 1967  11 Sheets-Sheet 2
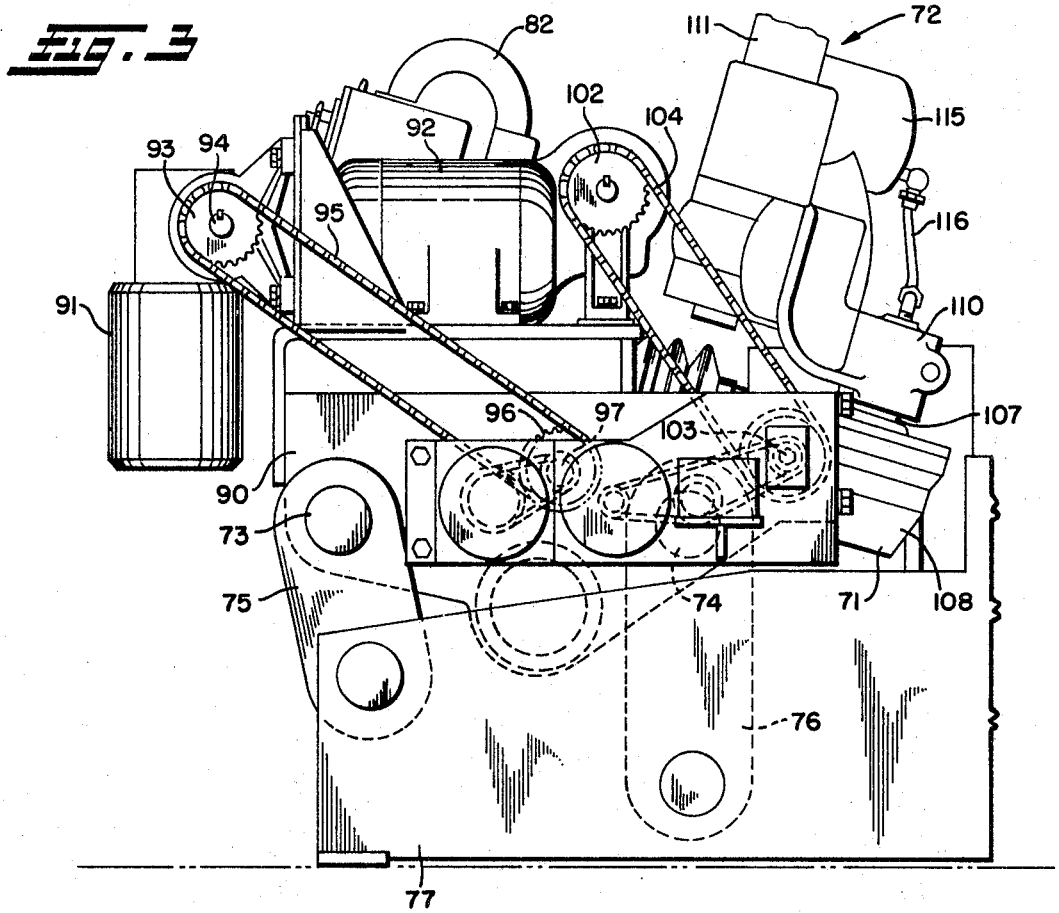
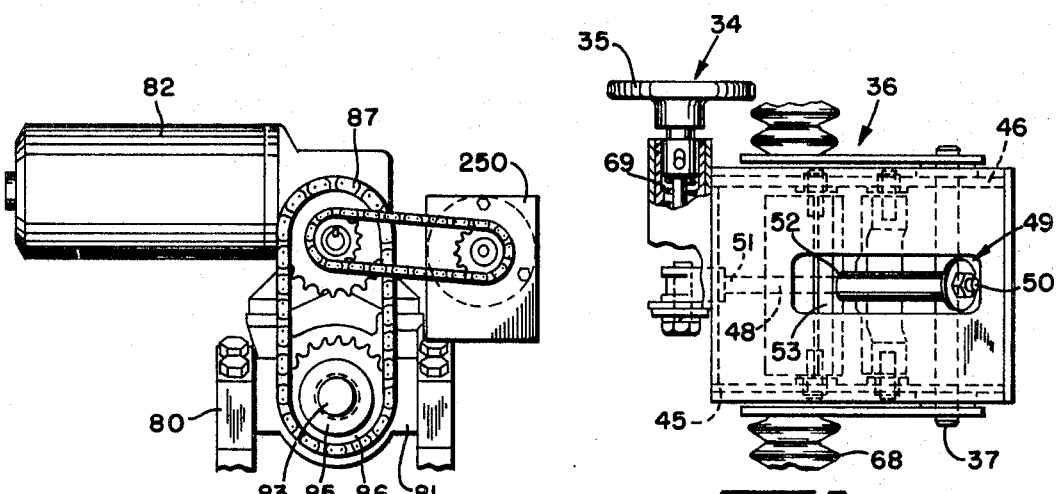
INVENTORS
GUSTAF E. ISAKSSON
THOMAS C. JONES
ERNEST S. ULM
HERBERT G. HAAS
BY *Oberlin, Maky & Donnelly*
ATTORNEYS

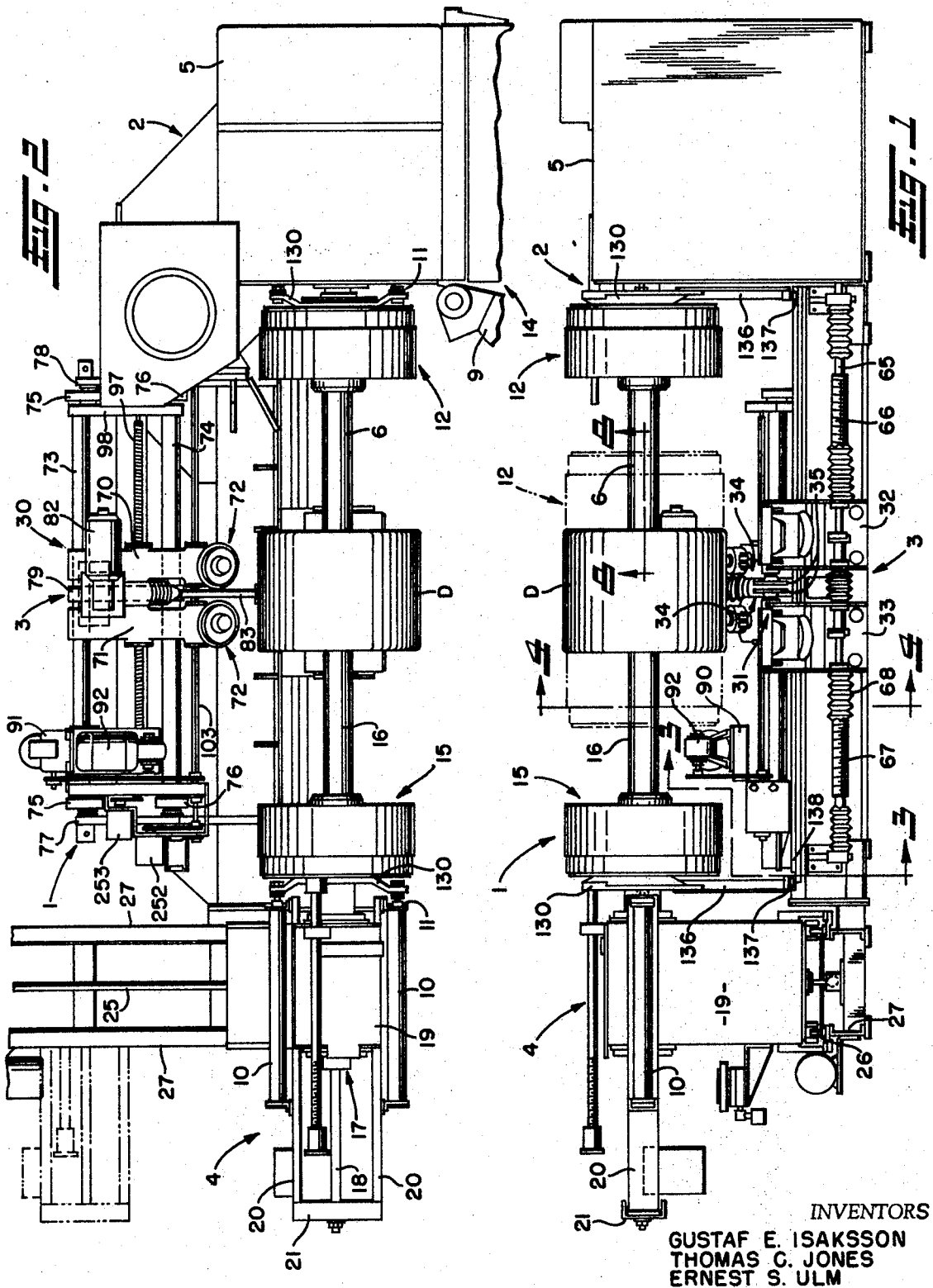

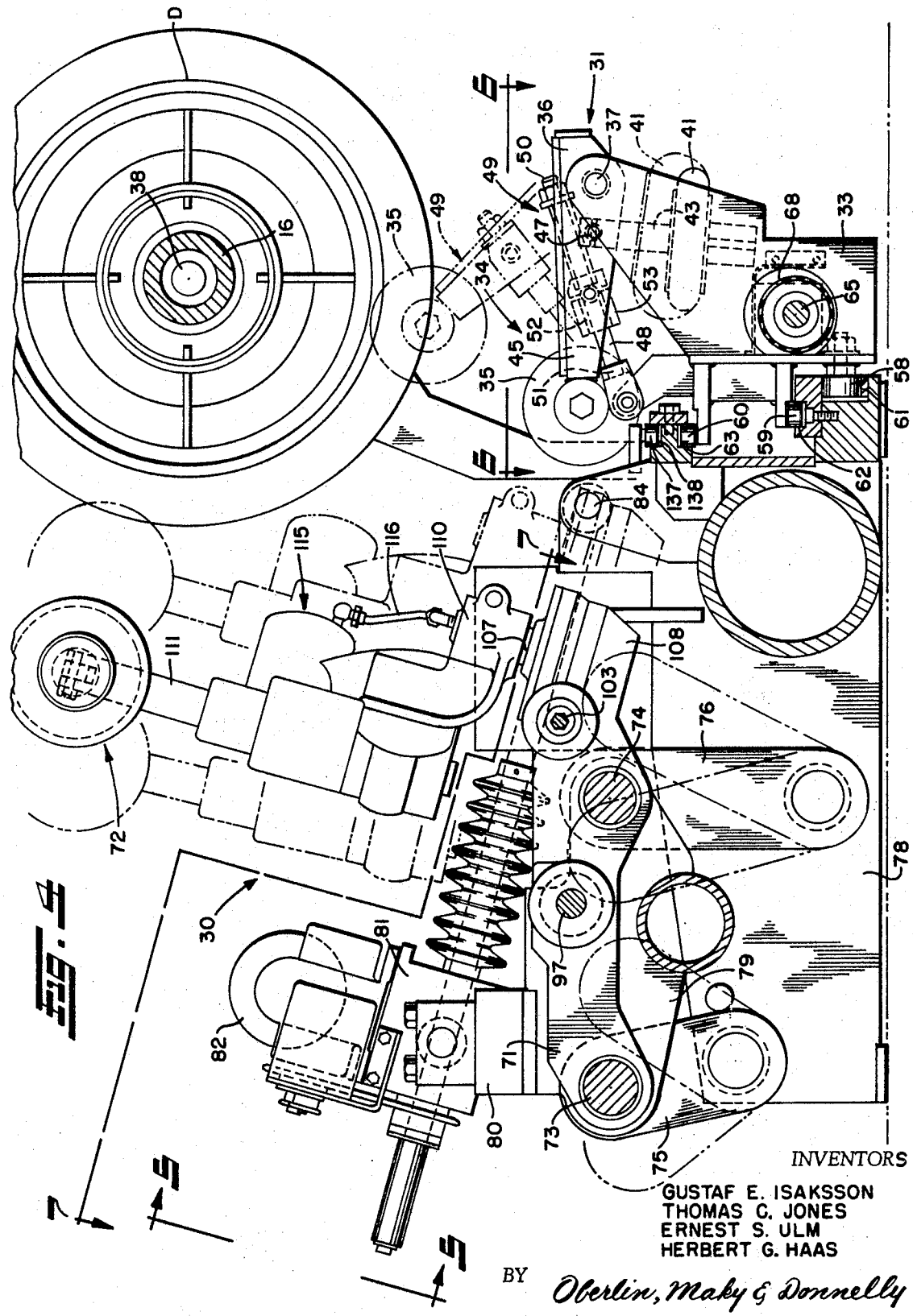

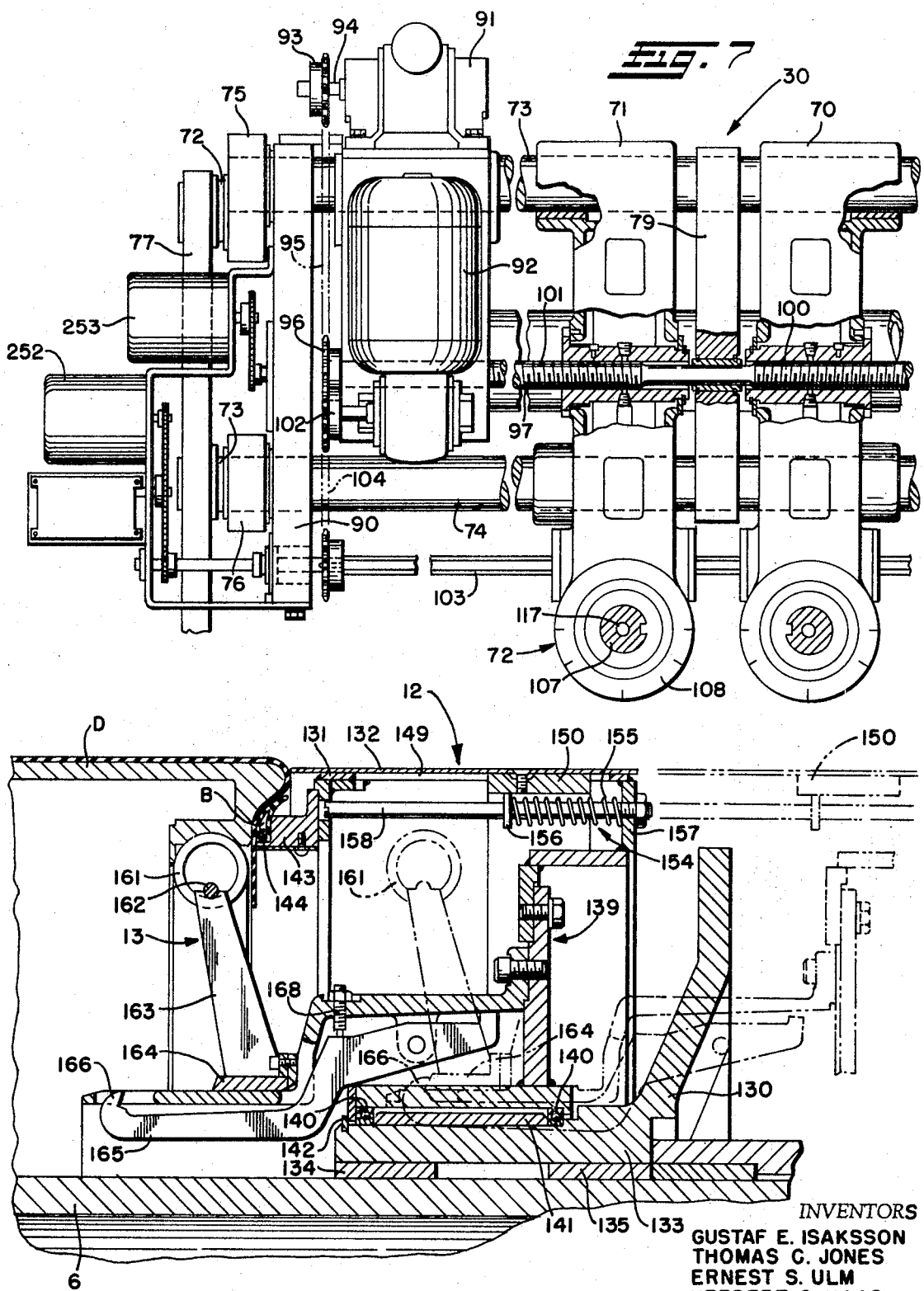

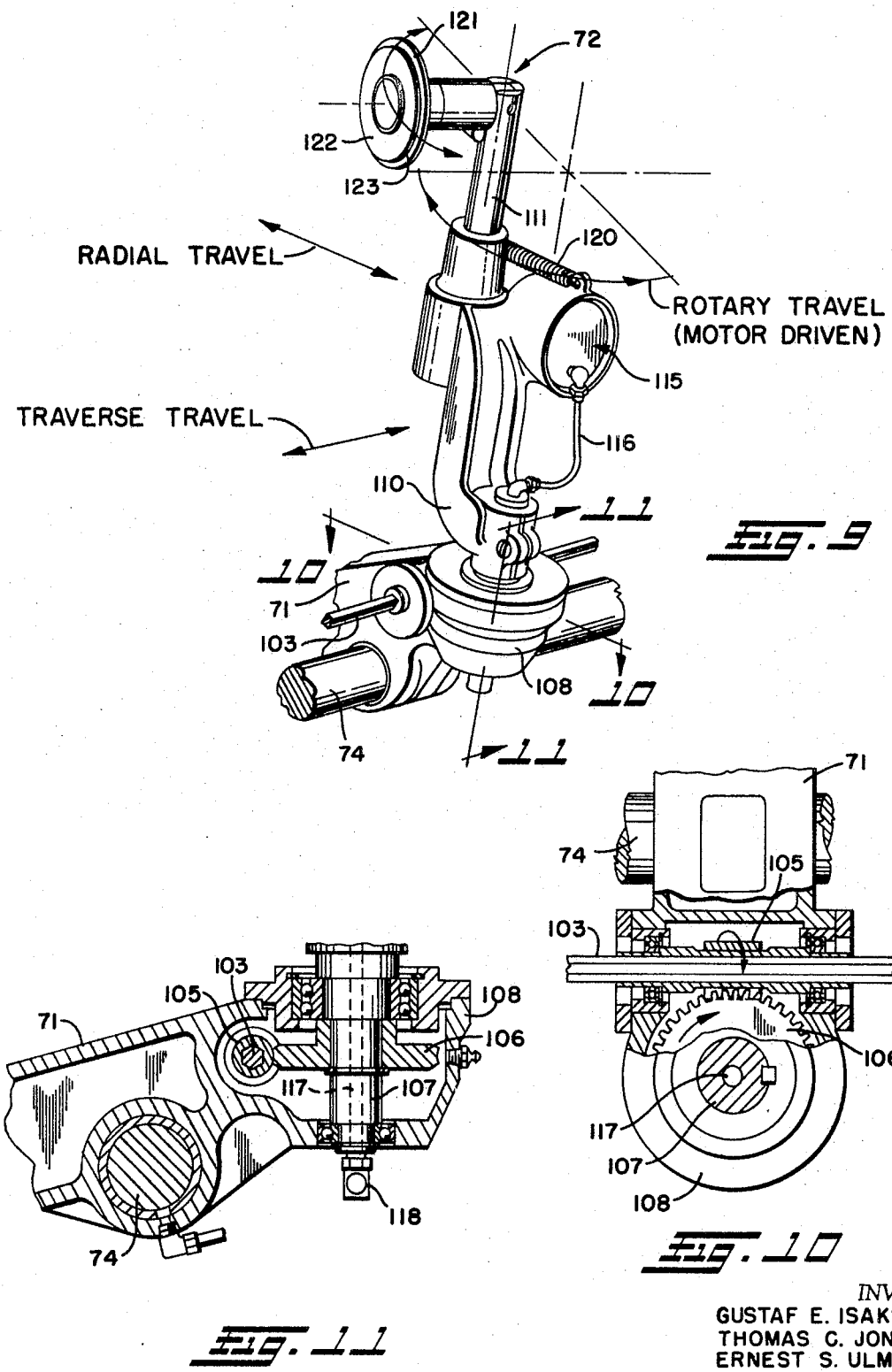

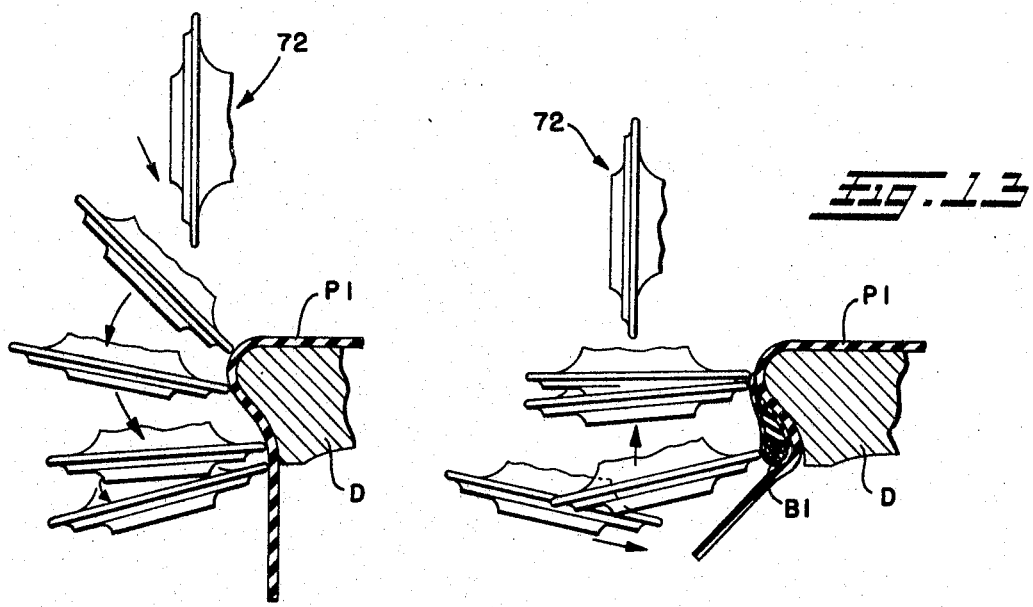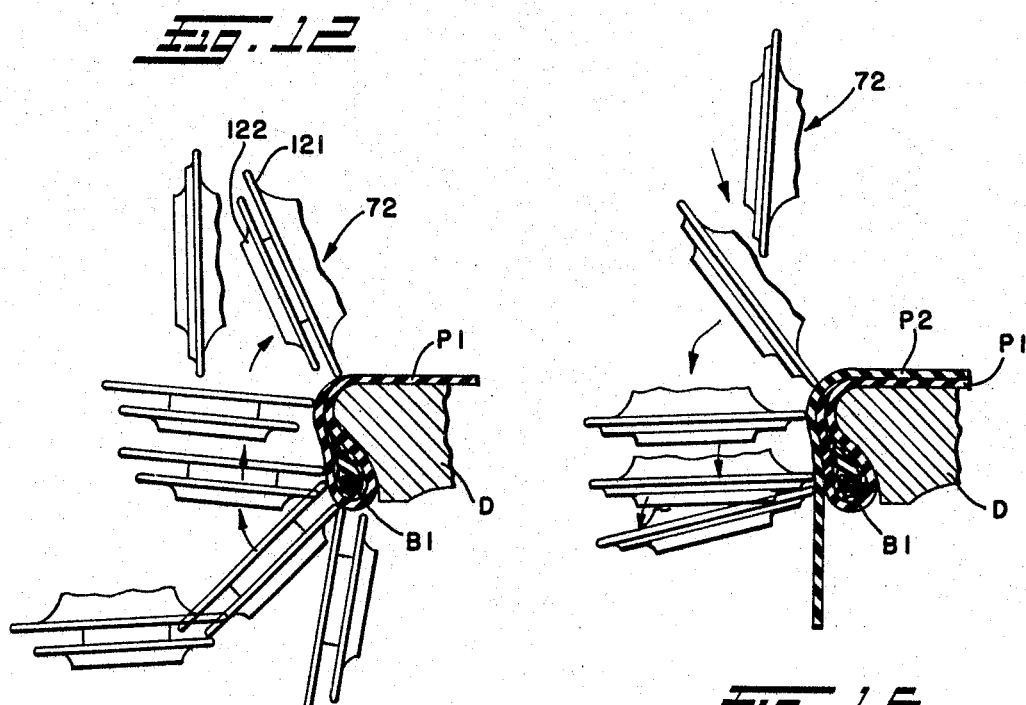

INVENTORS
GUSTAF E. ISAKSSON
THOMAS C. JONES
ERNEST S. ULM
HERBERT G. HAAS

BY *Oberlin, Maky & Donnelly*

ATTORNEYS

Aug. 18, 1970 G. E. ISAKSSON ET AL 3,524,784

TIRE BUILDING MACHINE

Filed Jan. 12, 1967 11 Sheets-Sheet 10

INVENTORS
GUSTAF E. ISAKSSON
THOMAS C. JONES
ERNEST S. ULM
HERBERT G. HAAS

BY Oberlin, Maky & Donnelly

ATTORNEYS

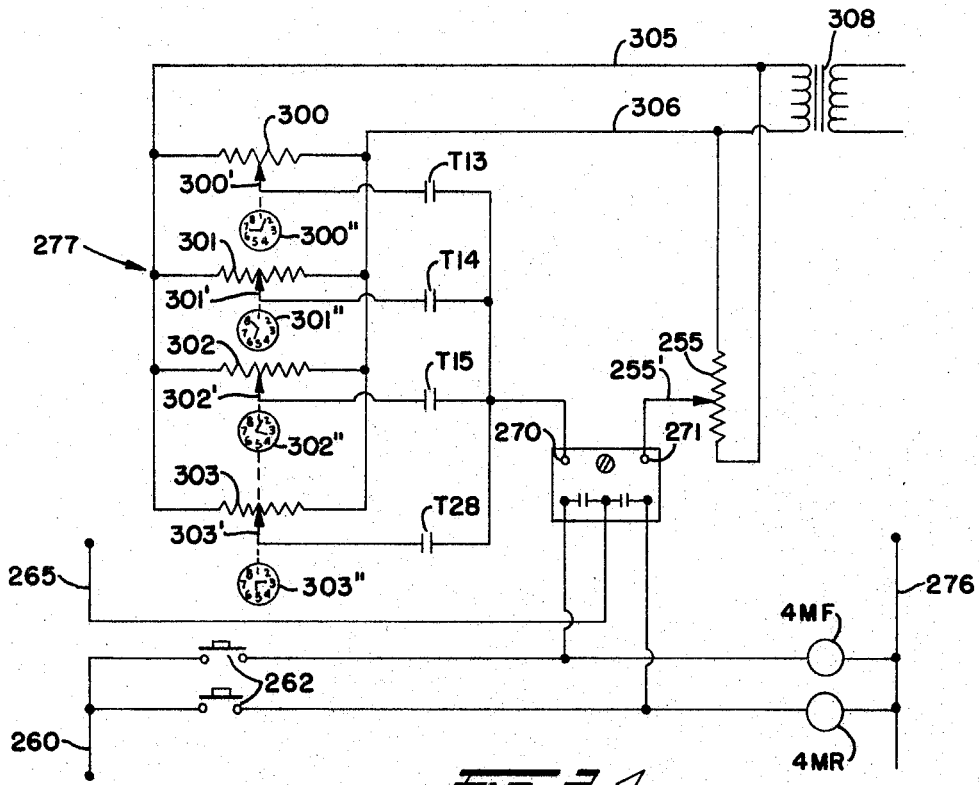
Fig. 2.4
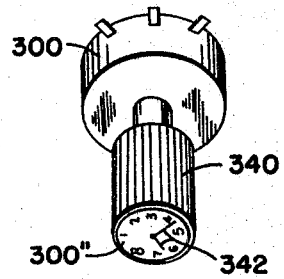
Fig. 2.4a
INVENTORS
GUSTAF E. ISAKSSON
THOMAS C. JONES
ERNEST S. ULM
HERBERT G. HAAS
BY Oberlin, Maky & Donnelly
ATTORNEYS

United States Patent Office 3,524,784
Patented Aug. 18, 1970

3,524,784
TIRE BUILDING MACHINE
Gustaf E. Isaksson, Columbiana, Thomas C. Jones, Salem, Ernest S. Ulm, Stow, and Herbert G. Haas, Canton, Ohio, assignors, by mesne assignments, to AMK Subsidiary Corporation, Akron, Ohio, a corporation of Ohio
Filed Jan. 12, 1967, Ser. No. 608,847
Int. Cl. B29h 17/18
U.S. Cl. 156—367
27 Claims

ABSTRACT OF THE DISCLOSURE

A tire building machine having stitcher stools whose movements are controlled by position feedback means which indicate the location of each of the tools, preposition control means which specify the desired tool positions, and a comparator for interrupting the tool movements when the signals received from the position feedback means match those of the preposition control means. A programmer selects the sequence in which the signals are compared to control sequence of tool movements. Ply pull-out rings located in drum ends are withdrawn with bead setter mechanisms for turning ply ends outwardly into contact with beads.

---

The present invention relates generally as indicated to a tire building machine and more particularly to certain improvements in the construction and automatic controls therefore making it especially suited for producing substantially automatically a wide variety of tire sizes and types with minimum adjustments.

Heretofore, automatic controls for tire building machines generally consisted of a plurality of switches which were successively tripped either by movement of the machine elements or by a multitude of cams for performing successive operations. Accordingly, when it was desired to vary the movements of the machine tools to produce different size tires, it was necessary either to physically change the location of the switches or replace or reorient the cams, both of which were laborious time consuming tasks.

With the machine of the present invention, however, it is a simple matter to change the tool movements, which is a principal object if this invention. This is due to the manner in which the tool movements are controlled. In general, such controls comprise position feedback means for indicating the location of each of the tools, preposition control means for indicating the desired tool positions, and a comparator for interrupting the tool movement when the signals received from the position feedback means match those of the preposition control means. Thus, when it is desired to vary the position of a tool, it need only be moved to that position and the preposition control means set to correspond to the position feedback means. Alternatively, in a dynamic mode, the setting for the preposition control means may be varied until the tool is moved to the desired position and the setting recorded.

Moreover, a tape or otherwise controlled programmer selects the sequence in which the preposition control means are to be compared with the position feedback means for each of the tools to control the sequence of tool movements. Thus, once a tape or card or the like has been programmed and the desired tool positions recorded, this information may be stored and utilized at any time to produce a green tire in accordance with the stored information.

Another object is to provide a tire building machine with novel bead setter mechanisms for locating the tire beads against the ends of the tire building drum, and novel ply pull-out rings which are adapted to be removed from the drum ends upon retraction of the bead setter mechanisms for turning the ends of a ply band outwardly in firm contact with the inner edge of the bead.

Still another object is to provide such a tire building machine with novel means for supporting the back stitcher tools for radial and traverse movement of the tire building drum.

A further object is to provide such a machine in which the lower stitcher tools are adapted to be brought into engagement with the underside of the finished green tire to assist in supporting the tire when the drum is collapsed for ease of tire removal from the drum.

Another object is to provide such a tire building machine with novel means for limiting the extent of movement of the lower stitcher tools toward the drum axis.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the ways in which the principles of the invention may be employed.

In such annexed drawing:

FIG. 1 is a side elevation view of a preferred form of tire building machine in accordance with this invention;

FIG. 2 is a top plan view thereof;

FIG. 3 is a partial end elevation view of the back stitcher assembly for the machine as seen from the plane of the line 3—3, FIG. 1;

FIG. 4 is a transverse section through the machine of FIG. 1 taken on the plane of the line 4—4 thereof;

FIG. 5 is a fragmentary end elevation view showing the radial drive for the back stitcher assembly as seen from the plane of the line 5—5 of FIG. 4;

FIG. 6 is a fragmentary top plan view of the lower stitcher assembly as seen from the plane of the line 6—6, FIG. 4;

FIG. 7 is a fragmentary horizontal section through the back stitcher assembly taken on the plane of the line 7—7 of FIG. 4, partially broken away to show the drive connection between the back stitcher assembly and axial drive shaft therefor;

FIG. 8 is a partial longitudinal section through the bead and ply rings and ply pullout mechanism for the machine taken on the plane of the line 8—8 of FIG. 1, but with the bead and ply rings and ply pullout mechanism shown in full lines in the operative position;

FIG. 9 is an isometric view of one of the back stitcher assemblies showing schematically the various directions in which the back stitcher assemblies may be moved;

Figure 20:
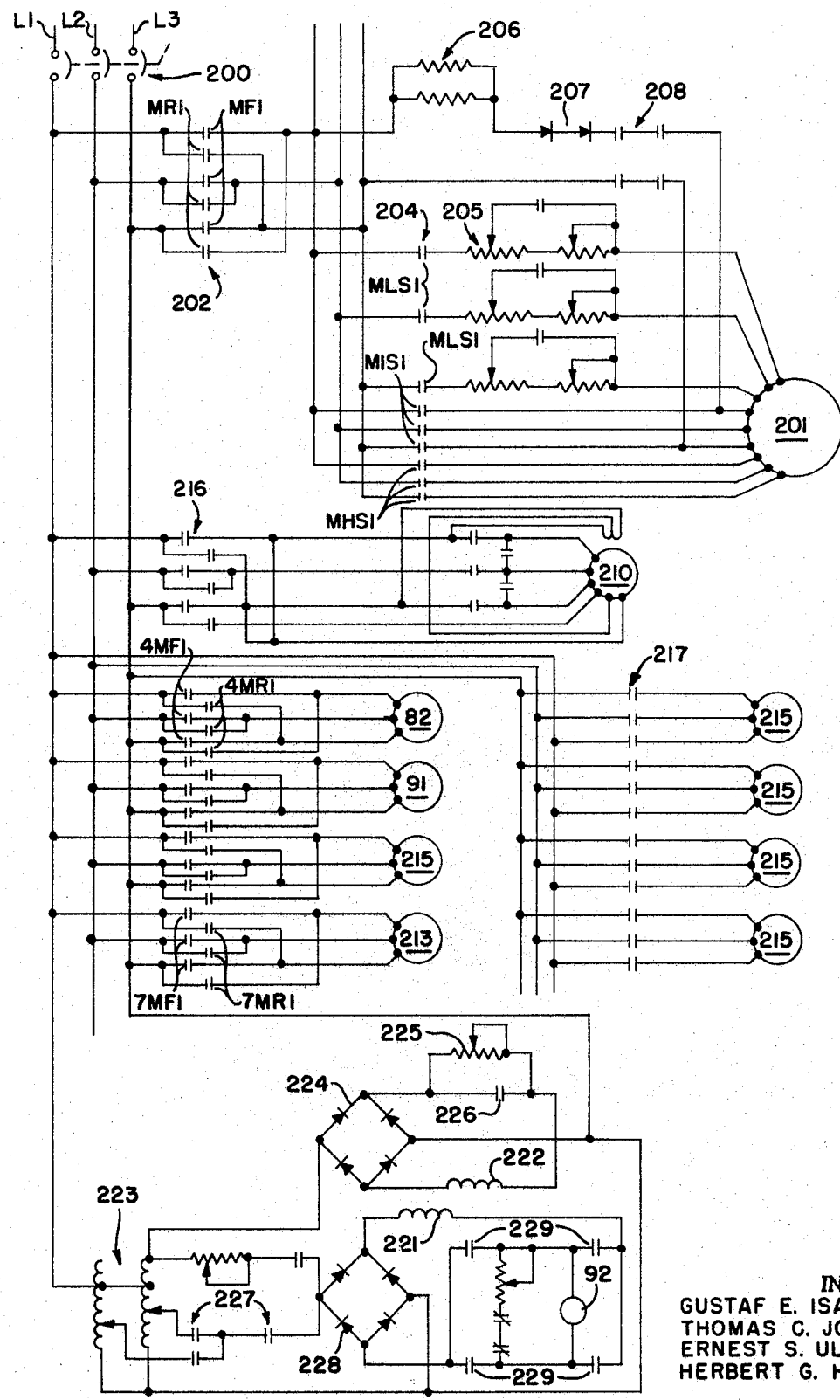
Figure 21:
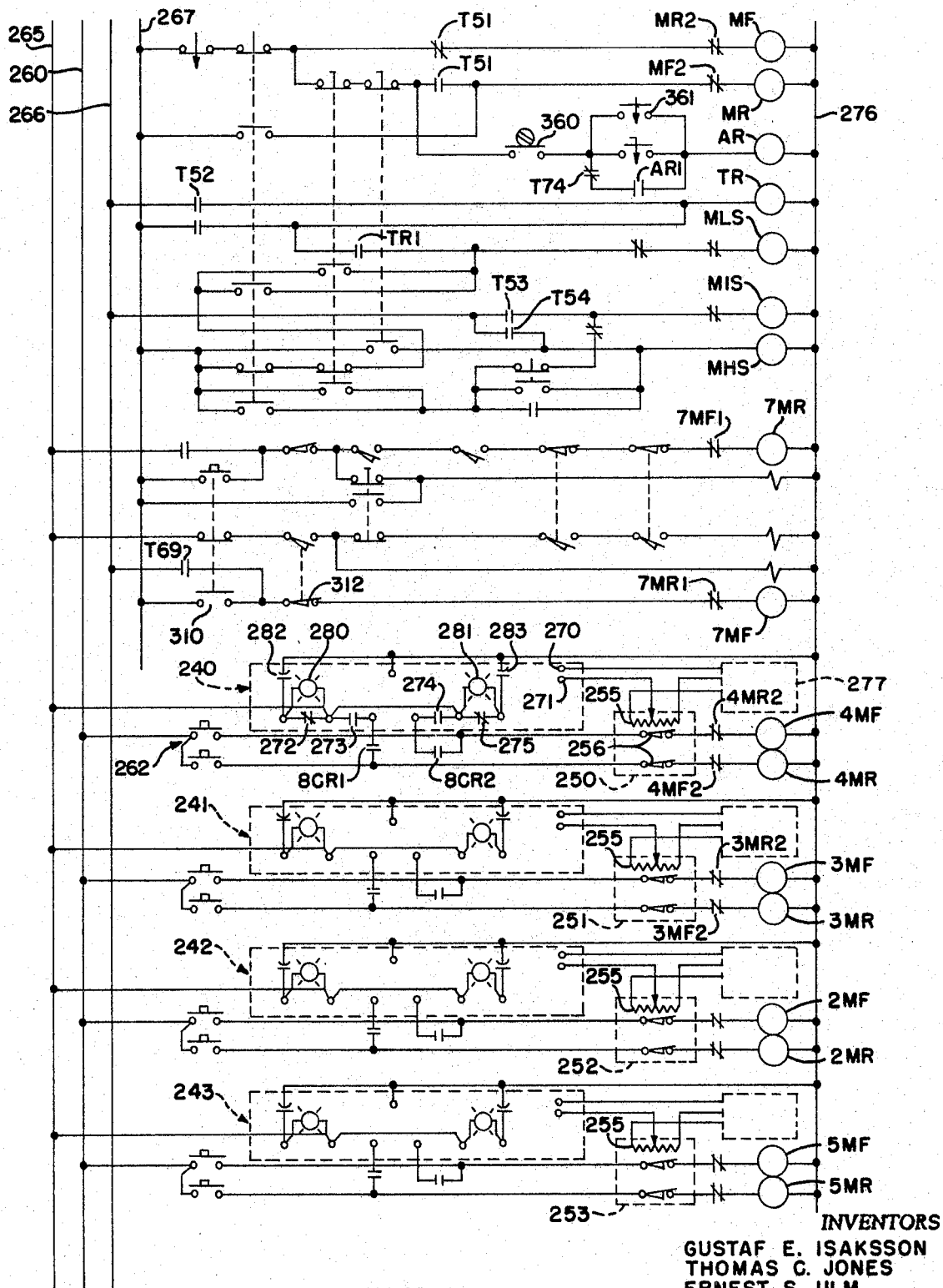
Figure 22:
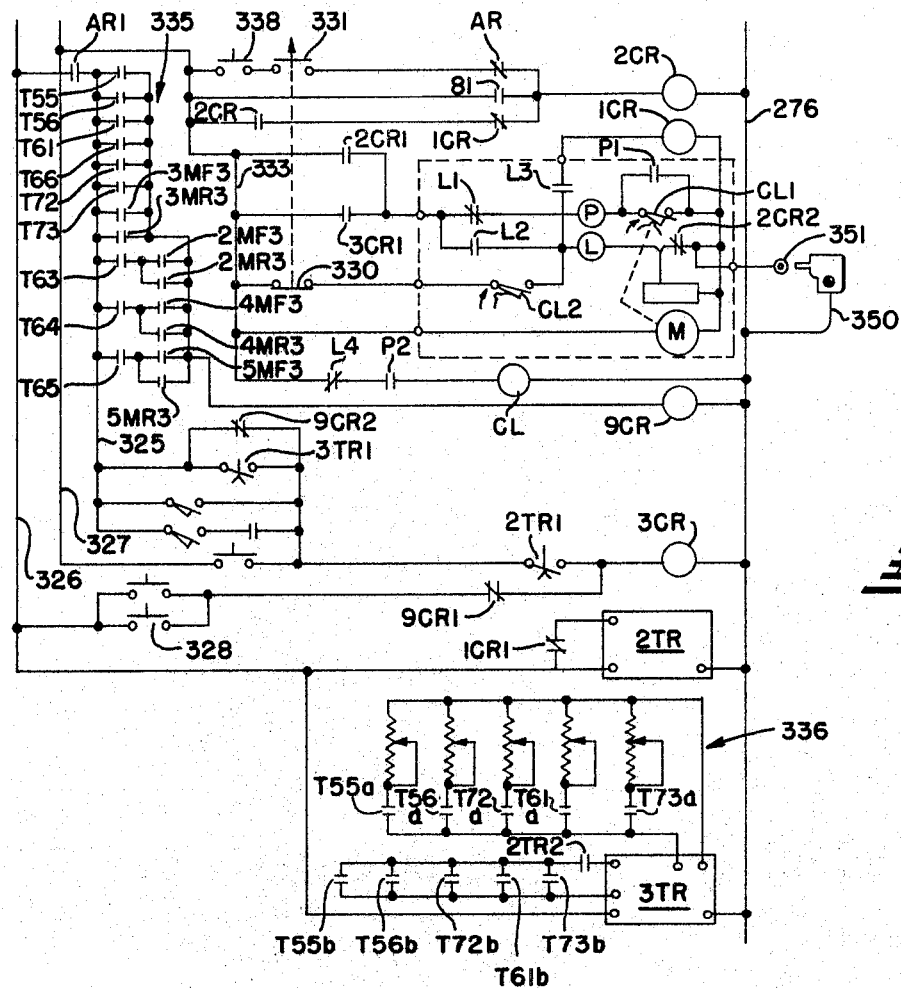
Figure 23:
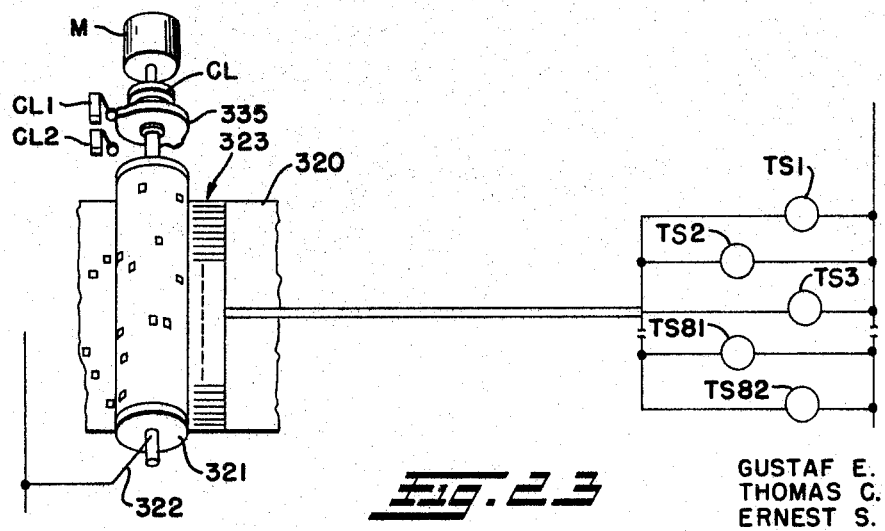

FIGS. 10 and 11 are respectively fragmentary horizontal and vertical sections through the rotary drive for the back stitcher assembly of FIG. 9 taken on the planes of the lines 10—10 and 11—11 thereof;

FIGS. 12-19 are schematic diagrams showing the successive movements of the back stitcher discs during the building of a typical dual bead truck tire or the like on the machine of the present invention;

FIG. 20 is a schematic diagram of a portion of the electrical system for the machine showing the power supply and switching circuitry for the various drive motors;

FIG. 21 is a schematic diagram of a portion of the automatic control circuitry showing the open and closed loop relay control circuitry;

FIG. 22 is a schematic diagram of a portion of the automatic control circuitry showing the tape reader and timing control circuitry;

FIG. 23 is a diagram showing the tape and tape reader and information storage relays;

FIG. 24 is a schematic diagram in simplified form of the closed loop position control system for the back stitcher radial motion; and FIG. 24a is an isometric view of a command position potentiometer utilized in this invention.

The preferred embodiment of tire building machine illustrated in the drawing is especially suited for use in making heavy duty truck tires and the like characterized by the provision of dual beads at each end of the carcass located radially inward a substantial distance from the tread portion. The plystock may be supplied to the machine as single ply or in the form of bands or elongated cylinders, built up of layers of the plystock, the number of layers and bands used being determined by the specific requirements of the tire in production. However, it should be understood that with slight modifications the machine disclosed herein may be used to make various other types of tires as well.

Referring now in detail to the drawing and first especially to FIGS. 1 and 2, the tire building machine is generally indicated at 1 and comprises three major assemblies, a headstock assembly 2; a center base assembly 3; and a tailstock assembly 4. The headstock assembly 2 consists of a housing 5 in which there is journalled the main drive shaft 6 for a collapsible tire building drum D of conventional type supported above the center base assembly 3. The main drive shaft 6 is suitably connected to a three-speed reversible electric motor 201 shown schematically in FIG. 20 contained within the housing 5 for driving of the drum D in opposite directions as determined by a tape control or the like in a manner to be later described.

Also supported by the headstock assembly 2 is a pair of bead setter cylinders identical to the bead setter cylinders 10 of the tailstock assembly 4 having their piston rods 11 connected to an inboard bead setter mechanism 12 slidably mounted on the drum drive shaft 6 for reciprocating movement toward and away from the collapsible drum D. Contained within the bead setter mechanism 12 is a ply pull-out mechanism 13 (see FIG. 8). The control panel 14 on which is mounted the operator's push button station may be located at the front of the housing 5 within easy reach of the operator. A tool tray 9 is pivoted to the housing for access behind the panel.

The outboard bead setter mechanism 15 of the tailstock assembly 4 is of a construction similar to that of the inboard bead setter mechanism 12, slidably mounted on a horizontally extending shaft 16 for movement toward and away from the drum D upon actuation of the associated bead setter cylinders 10, and adapted to receive a ply pull-out mechanism 13 therein. The horizontal shaft 16 may be disengaged from the drum D upon actuation of a piston-cylinder assembly 17 whose rod 18 is fixed with respect to the tailstock assembly housing 19 by a pair of laterally spaced channel members 20 extending outwardly from the housing 19 and a cross member 21 between the outer ends of the channel members 20 to which the rod 18 is bolted. When the shaft 16 is retracted, the entire tailstock assembly 4 including the outboard bead setter mechanism 15 and horizontally extending shaft 16 may be withdrawn in a transverse direction by actuation of a screw 25 to permit band and bead placement on the drum D and green tire removal therefrom. The tailstock assembly 4 is provided with rollers 26 which engage tracks 27 for guiding the tailstock assembly during such transverse movement.

Between the headstock assembly 2 and tailstock assembly 4 is the center base assembly 3 which joins and maintains the alignment of such headstock and tailstock assemblies. The center base assembly 3 supports both a back stitcher assembly 30 and lower stitcher assembly 31 for stitching together of the various components of the tire, in a manner to be subsequently explained. A stock servicer or the like, not shown, may be provided for transporting the tire building stock within easy reach of the operator for application onto the tire building drum D.

The detailed operation and structure of the various assemblies of the tire building machine 1 referred to above will now be described in detail under the appropriate headings.

LOWER STITCHER ASSEMBLY

(FIGS. 1, 4 and 6)

The lower stitcher assembly 31 comprises a pair of lower stitcher carriages 32, 33 on each of which there is mounted a ply stitcher tool 34 in the form of a disc 35 rotatably supported on the end of an arm 36 pivoted to their respective carriages 32, 33 as at 37. The pivots 37 for the lower stitcher discs 35 are shown extending in a direction parallel to the drum axis 38, but in certain instances the stitcher discs may be canted toward each other as in FIG. 3 of Pat. No. 3,125,481, granted to Edwin E. Mallory and Armindo Cantarutti on Mar. 17, 1964.

Normally, the lower stitcher discs 35 are held in an inoperative position remote from the drum D by gravity. Swinging of the stitcher discs 35 in a radial inward direction toward the phantom line position of FIG. 4 for stitching together of the tire ply bands is effected through inflation of a rubber bag or bellows 41 operatively connected to the arms 36 by a pressure plate 42 which bears against the inflatable bag 41 and an extension 43 pivoted between the side plates 45, 46 of the arm 36 by pins 47. A rod 48 having a stop 49 on the outer end 50 thereof is pivotally connected at its inner end 51 to the associated carriages 32, 33 and extends through an opening 52 in a slideway 53 pivoted between the side plates 45, 46 of the lower stitcher arm 36 for limiting the extent of swinging movement of the stitcher discs 35 toward the drum axis. Upon release of the air pressure, the stitcher discs 35 are immediately returned by gravity to the inoperative solid line position of FIG. 4.

For guiding the movement of the lower stitcher discs 35 in an axial direction along the outer face of the drum D, the carriages 32 and 33 are each provided with a plurality of guide rollers 58, 59 and 60 disposed in tracks 61, 62 and 63 in the center base assembly 3 which are parallel to the axis 38 of the drum D. A drive shaft 65 having threads 66 and 67 of opposite hand engaging the respective carriages 32 and 33 may be driven in opposite directions by a reversible drive motor 210 (shown in FIG. 20) for moving the carriages 32 and 33 away and toward each other to permit stitching together of the tire plies over the full length of the drum D. Collapsible sleeves 68 or the like may be placed over the threads 66, 67 to protect them against damage.

Initially, the lower stitcher discs 35 are disposed in their innermost axial positions adjacent each other in line with the middle of the drum D, but radially outwardly spaced therefrom. However, after the first band of the desired number of plies has been placed on the drum D by the operator, the drum is rotated at low speed and the stitcher discs 35 are caused to move axially away from each other with air pressure supplied to the inflatable bag 41 for yieldably pressing the discs 35 against the plies. As the stitcher discs 35 move past the ends of the drum, they are urged further radially inwardly by the respective inflatable bags 41 to the phantom line position of FIG. 4 to cause initial turn down or "break-over" of the ply ends. Springs 69 in the hub of the lower stitcher tools 34 provide loading for this operation. Afterwards, the ply ends are turned down and stitched together by the back stitcher assembly 30, in a manner to be now described.

BACK STITCHER ASSEMBLY
(FIGS. 2-5, 7 and 9-11)

The back stitcher assembly 30, like the lower stitcher assembly 31, is supported by the center base assembly 3 adjacent the outer face of the drum D but circumferentially spaced from the lower stitcher assembly 31, and consists of a pair of carriages 70, 71 on each of which there is mounted a back stitcher tool 72 for traversing the drum face in an axial direction from the center out and return for ply stitching. In addition, the back stitcher tools 72 are mounted for radial movement toward and away from the drum D in a straight line from the rear of the drum, as well as for rotary motion about the axes of the tools to adjust to the contour of the drum shoulder during the ply turn down, turn up, and bead stitching operations to be later discussed.

The back stitcher carriages 70, 71 are mounted on a pair of horizontal support shafts 73 and 74 which extend parallel to the drum axis and are supported at each end by links 75 and 76 pivotally connected to the end support plates 77 and 78 of the center base assembly 3. The support shafts 73, 74 also carry a support member 79 adjacent the middle of their lengths between the carriages 70 and 71 on which there is mounted a pillow block 80 for journalling of a platform 81 for the radial drive motor 82. A radial drive shaft 83 having its inner end fixed against rotation but mounted for vertical pivotal movement about an axis 84 parallel to the drum axis is threadedly engaged in the hub 85 of a sprocket 86 carried by the platform 81 and adapted to be driven by the radial drive motor 82 through a suitable chain drive 87 (see especially FIGS. 4 and 5). Accordingly, rotation of the sprocket 86 in opposite directions will cause axial movement of the platform 81 in opposite directions along the radial drive shaft 83, thereby effecting a corresponding radial inward and outward movement of the support shafts 73 and 74 and carriages 70 and 71 supported thereby.

Also mounted on the support shafts 73 and 74 adjacent one end thereof is a support bracket 90 (FIG. 7) for the axial and rotary drive motors 91 and 92 for the back stitcher tools 72. The axial drive motor 91 has a sprocket wheel 93 keyed to the output shaft 94 thereof with a suitable chain 95 interconnecting the sprocket wheel 93 and a similar sprocket wheel 96 fixed to a drive shaft 97 supported at one end by the support bracket 90 and at the other end by an additional support plate 98 carried by the support shafts 73, 74. Referring further to FIG. 7, the drive shaft 97 has threads 100 and 101 of opposite hand threadedly engaging the carriages 70 and 71, respectively, whereby rotation of the drive shaft 97 in opposite directions will cause the carriages 70 and 71 to traverse the drum D in an axial direction along the support shafts 73 and 74 from the center of the drum out and return.

As shown in FIGS. 2, 7 and 10, the rotary drive motor 92 likewise supports a sprocket wheel 102 for driving a splined shaft 103 through a conventional chain drive 104. The ends of the splined shaft 103 are suitably journalled in the support bracket 90 and support plate 98 for radial movement with the carriages 70, 71 and there is a pair of worm gears 105 slidably keyed to the shaft 103 and journalled in their respective carriages 70, 71 for axial movement therewith. One of the worm gears 105 for the carriage 71 is illustrated in FIG. 10, meshing with a worm wheel 106 keyed to a shaft 107 journalled in the housing 108 of the carriage 71. The axis of the shaft 107 extends chordwise of the drum D perpendicular to the axis of the radial drive shaft 83. Fixed to the shaft 107 for rotational movement therewith is the stitcher housing 110 in which is journalled the stitcher carrier shaft 111 whose axis is parallel to the axis of the shaft 107. The mounting for the other back stitcher tool 72 supported by the carriage 70 is identical, except that the thread on the worm gear 105 for the carriage 71 is a left-hand thread while the thread on the worm gear 105 for the carriage 70 is a right-hand thread, whereby rotation of the splined shaft 103 in opposite directions will cause a rotary motion of the stitcher tools 72 in opposite directions about the axes of their respective shafts 107.

Each back stitcher tool 72 may also be rotated about its own stitcher carrier shaft 111 as by means of a pneumatic piston-cylinder assembly 115 having its piston rod in the form of a gear rack in meshing engagement with a gear keyed to the lower portion of the stitcher carrier shaft, as in the patent to Edwin E. Mallory, Pat. No. 3,031,353, granted Apr. 24, 1962. Thus, when air under pressure is supplied to the piston-cylinder assembly 115 by way of a conduit 116 and a passage 117 in the shaft 107 through a rotary joint 118 attached to the bottom of the shaft 107, the back stitcher tool 72 will be rotated in one direction about the axis of the stitcher carrier shaft 111. A return spring 120 or the like may be provided for returning the back stitcher tool 72 to its original position when the piston-cylinder assembly 115 is vented., The back stitcher tools 72 themselves may be in the form of a single disc rotatable about their own axes, but desirably consist of a pair of different sized stitching discs 121 and 122 separately journalled, with the smaller stitching disc 122 received in a recess 123 in the larger stitching disc 121 and mounted for axial movement into and out of the recess 123, similar to that shown in the aforementioned Mallory Pat. No. 3,031,353. Such a tool construction permits the use of the larger disc 121 by itself during certain of the tire building operations and both the larger and smaller stitching discs 121 and 122 during other tire building operations, to be fully explained hereafter.

BEAD SETTER AND PLY PULL-OUT MECHANISMS
(FIGS. 1, 2 and 8)

Both the inboard and outboard bead setter mechanisms 12 and 15 are substantially identical in construction and accordingly only the inboard bead setter mechanism 12 will be described in detail. Such inboard bead setter mechanism consists of an annular plate 130 to which the piston rods 11 are connected and a pair of inner and outer sleeve members 131 and 132 surrounding the annular plate 130. The annular plate 130 has a sleeve portion 133 slidably mounted on the main drive shaft 6 by a pair of sleeve bearings 134, 135 and an extension 136 (see FIG. 1) projecting downwardly therefrom with a guide roller 137 on the lower end thereof which is guided by an axially extending track 138 during reciprocating movements of the bead setter mechanism. The inner sleeve member 131 has a stepped central hub portion 139 journalled to the sleeve portion 133 of the plate 130 for relative rotation as by means of a pair of axially spaced thrust bearings 140 with a spacer 141 disposed therebetween. A snap ring 142 or the like at the outer end of the sleeve portion 133 maintains the annular plate 130 and inner sleeve member 131 in the desired assembled relation. Secured to the inner end of the inner sleeve member 131 is a bead placement ring 143 provided with a step 144 to carry a bead B which is to be coaxially pressed against the adjacent end of the drum D in a manner to be subsequently explained.

The outer sleeve member 132 is telescoped over the inner sleeve member 131 and is of a diameter approximately equal to the diameter of the drum D, such inner sleeve member having one or more longitudinal slots 149 therein with keys 150 projecting from the outer sleeve member 132 into the slots 149 for keying of the two sleeve members together against relative rotational movement, but not relative axial movement. Between the inner and outer sleeve members 131 and 132 there is a lost motion connection 154 for urging the sleeve members axially apart, which may be in the form of a plurality of compression springs 155 (only one being shown) the ends of which are seated against flanges 156 projecting inwardly from the keys 150 and an annular plate 157 attached to the outer end of the outer sleeve member 132. A rod member 158 may extend through each compression spring 155 and an aperture in the flange 156 for supporting the spring 155. Such a lost motion connection between the inner and outer sleeve members 131, 132 permits engagement of the drum D by the outer sleeve member 132 and pressing of the bead B against the end of the drum D during movement of the annular plate 130 toward the drum through actuation of the piston-cylinder assemblies 10 irrespective of whether the bead placement ring 143 is positioning the first or second tire bead.

Once the bead B is firmly pressed against the turned down plies of tire stock as in FIG. 8, the bead setter mechanism 12 may be retracted to permit bead stitching and ply turn up by the back stitcher tools 72. During such retraction of the bead setter mechanism it is preferred that the ply ends be pulled out away from the drum to facilitate ply turn up. For that purpose, there is provided the ply pull-out mechanism 13 which in the form illustrated comprises a coil spring 161 in the shape of a ring having an expanded diameter somewhat larger than the inside diameter of the bead B. The coil spring 161 has a rigid wire 162 inserted through the coils and bent in the shape of a ring, such ring being supported by a plurality of spoke-like arms 163 projecting radially outwardly from a central sleeve 164.

A ply pull-out mechanism 13 may be slidably received on the end of the stepped central hub portion 139 of both the inboard and outboard bead setter mechanisms 12 and 15 for retraction therewith through engagement of the central sleeve 164 by a plurality of fingers 165 pivoted to the central hub portion 139 and having hook portions 166 on the end thereof adapted to be swung radially outwardly by centrifugal force during rotation of the sleeve members 131, 132 with the drum D. Spring detents 168 may be provided for depressing the hook portions 166 when there is no centrifugal force acting on the fingers 165 to permit easy removal of the ply pull-out mechanism 13 from the bead setter mechanism.

The structure of the tire building machine 1 of the present invention having thus been set forth, the operation of the machine and controls therefor will now be described in detail.

POSITION CONTROL ELEMENTS AND THEIR FUNCTION

The tire building machine is equipped for complete automatic control except for certain operator functions such as the placement of ply bands on the drum D and the application of cement or gas to the ply bands already on the drum. The machine is under the command of a tape and tape reader combination which energizes the various mechanisms of the machine and sets the sequence of operations. The control of the machine is in part an end position control system where some of the mechanisms are driven by an electric motor in an open loop mode to a position where a limit switch is made to interrupt energization of the motor. Other mechanisms including the lower and back stitchers 34 and 72 are provided with an analogue closed loop position control wherein the desired command information may be programmed into the machine to cause the stitchers to move to predetermined positions throughout the tire-building cycle. Since the movement of the back stitchers 72 is controlled by radial, rotary, and axial drives, a compound movement of any two or all of the three drives may be employed to create a contour movement of the back stitchers 72 for turning down the plies or for stitching the beads to the bands.

The tape reader is normally adapted to operate in a step-by-step manner allowing a certain time for the machine element under control to complete its movement. However, this time interval may be interruped when specifically called for by tape command to allow sufficient time for tool positioning, revolution of the drum D or various other longer itme delays required for certain operations of the machine. Since the machine is under tape control, it is a simple matter to provide and program different tapes for different sizes of tires. Additionally, as will be pointed out in more detail, the automatic control system of this machine has several unique features in providing a versatility of tool set up. It will be shown that when a new tape is desired for a certain tire size, the machine elements may be manually moved to their various positions and the electrical positions may be recorded, or alternatively, the machine may be moved to position under partial control of the automatic control system to attain a faster set up. The tapes may, of course, be used over and over again or they may be stored for future use and it will only be necessary to reset certain limit switches on the machine itself to prepare the machine for the building of different size or type tires.

Reference is now made to FIGS. 20-24 which show the automatic control circuitry for the tire building machine and which comprises switching circuitry located in the control panel 14 and control circuitry located in a free-standing control enclosure (not shown), convenient to the operator. The control panel 14 contains the motor contactors and starting relays, and in addition, the push-button switches for manually energizing the machine 1. The control enclosure is remotely located from the machine but easily accessible to the operator and houses the complete programming assembly including the tape reader, position potentiometers, and position comparing circuitry.

As seen in FIG. 20, the switching circuitry for the various drive motors of the machine is for the most part standard. A three-phase power source is brought into the control cabinet on lines L1, L2, and L3 through a circuit breaker 200. A three-speed drive motor 201, utilizing dynamic braking, is used to drive the main drive shaft 6 for the collapsible tire building drum D. Standard reversing contacts 202 are employed to change the phase relationship of the input line voltage. Groups of high, intermediate, and low speed contacts 204 then apply this voltage to appropriate connections on the drum drive motor 201. Located in series with the low speed contacts are resistances 205 which may be individually adjusted to provide an optimum low speed. Dynamic braking on the main drum motor 201 is accomplished by applying half wave DC directly across one phase of the motor winding. The line voltage is passed through dynamic braking resistors 206 and a half-wave rectifier 207 to provide the DC voltage. Interposed in the dynamic braking circuitry are contacts 208 which control the application of the half-wave DC to the motor winding. All of the contacts described in this portion of the control circuitry are contacts of relays energized at different times during the program control of the machine tool. The remainder of the circuits shown in FIG. 20 cover the switching control of the various other motors for the machine tool.

Included in these are the lower stitcher motor 210, the back stitcher radial and traverse motors 82 and 91, the tailstock motor 213, and several auxiliary motors 215. The circuitry for these motors may include run and reversing contacts 216 for changing the direction of rotation of the motors or just run contacts 217 and for the most part is standard circuitry and will not be further described.

The circuitry for the rotary back stitcher motor 92, however, is somewhat different since this is a DC motor which uses series and shunt field windings 221 and 222. Line voltage is applied to a pair of powerstats 223 whose sliders may be adjusted to provide different voltage levels for index and work operation. The voltage from one powerstat is applied to a shunt field rectifier circuit 224 which provides DC voltage for energization of the shunt field 222 of the motor 92. A field weakening resistor 225 is located in series with the shunt field 222 and is switched into and out of the circuit at appropriate intervals by contact 226. Different levels of voltage may be obtained from the powerstats 223 by suitable switching of contacts 227 and applied to a second rectifier circuit 228 which provides full-wave DC voltage for application to the series field 221 and the armature of the rotary back stitcher motor 92. Reversing contacts 229 are provided to change the direction of flow of current through the armature of the motor 92 and apply the appropriate preset voltages for forward and reverse direction of operation.

Referring now to FIGS. 21 and 22, there is shown an across-the-line diagram of the automatic control circuitry for operating the tire building machine 1. The circuitry is shown in somewhat simplified form so as not to unduly complicate the drawings. It will be appreciated that the actual circuit includes a multiplicity of relays and solenoids to control the operation of various elements and auxiliary functions of the machine and further includes numerous interlocks to safeguard the operation. Basically the control system is a position control system and includes open-loop control for such functions as drum D rotation, bead set, chafer and sidewall drive, and tailstock movement. Closed loop continuous position control is utilized for the lower and back stitchers 34 and 72 and includes four basic circuits 240–243 as shown in FIG. 21. The operation of each of these circuits is quite similar and for purposes of this description only one of the circuits will be detailed herein.

Position sensors 250–253 are mounted on the machine 1 to monitor the movement of the lower and back stitchers and to provide an output voltage corresponding with this movement. Each position sensor comprises a precision ten-turn potentiometer 255 mechanically coupled to the lead screw or some other drive portion of each of the associated stitchers. In addition, a pair of limit switches 256 are incorporated in each position sensor to prevent overrunning and damage to the unit. This description deals only with the radial movement of the back stitchers 72 and it will be appreciated that a similar operation obtains for each of the other stitcher movements. A pair of relays, 4MR and 4MF, control the reverse and forward direction of movement of the radial back stitcher motor 82 as shown in FIG. 20. Each relay has contacts 4MR1, 4MR2, etc., and 4MF1, 4MF2, etc. which become operative in response to energization of the respective relay. Each relay is individually energizable from two separate sources. A machine-control jog line 260 is provided which is energized when it is desired to jog the machine to various positions. Each relay is connected to this line in series with a manually operable direction control switch 262 which closes its respective contacts upon selection of either the forward or reverse direction of movement. In automatic control, however, line 260 is de-energized and line 265 has power applied to it. Similarly, lines 266 and 267 are energized through interlocks or switches under control of the operator. Voltage is then applied to relays 4MR and 4MF through comparator circuitry 240 and relay contacts 8CR1 of the stitcher tool interlock relay. The comparator 240 is a standard voltage sensing and comparing unit which compares the voltages applied at its terminals 270 and 271. If the voltage at terminal 270 is less than the voltage at terminal 271, contacts 272 and 273 will operate to change condition from the normal state as shown in FIG. 21, and if the voltage at terminal 270 is greater than the voltage at terminal 271, contacts 274 and 275 will operate to change state. If the voltages at terminals 270 and 271 are equal, then the contacts 272–275 will remain in their normal condition. A feature of the comparators 240–243 is that the range of comparison, that is, the difference in voltage required between terminals 270 and 271 at which a comparison occurs may be varied to create a variable null zone which is advantageous in providing anticipatory stopping of various tools as will be brought out in greater detail hereafter. The comparator 240 is the sensing element in an AC bridge network consisting of the machine position potentiometer 255 and a command position potentiometer 277, which bridge circuit is energized by a six volt AC power source. The closing of contacts 273 or 274 due to the sensing of under or over voltage, respectively, at contacts 270, 271 caused by a difference between machine position and command position will connect line 265 to either relay 4MR or 4MF to drive the back stitcher 72 radially to the command position. When such position is reached, a null will be sensed in the comparator 240 and the contact 273 or 274 which had been closed, will open, de-energizing the circuit and stopping the stitcher radial movement. Additionally, the comparator 240 contains a pair of lamps 280, 281, each connected in parallel with contacts 272 and 275 to give a visual indication of off-null conditions which is useful not only in normal automatic operation, but also in the tool set-up mode to be described later. When contacts 272 or 275 are opened in an off-null condition, the corresponding lamp 280, 281 is connected in series between line 265 and line 276 in series with a capacitor 282, 283. When contact 272 or 275 is closed, the corresponding lamp is shorted out and prevented from lighting. The capacitors 282, 283 serve to drop the voltage to the lamps and thus prevent short circuiting of the lines when contacts 272 and 275 are closed.

The command position potentiometer 277 circuitry is more clearly shown in FIG. 24 as consisting of a plurality of potentiometers 300–303, only four of which are illustrated, but there are desirably sixteen altogether, preset to correspond to desired machine positions, any one of which may be switched into the comparator 240 circuitry under control of the tape reader control system to be described in more detail hereafter. These potentiometers provide a group of sixteen presettable commands for the back stitcher radial drive. It will be understood that similar groups of potentiometers are provided for the lower stitcher, and back stitcher rotary and axial drives. The command potentiometer 300, for example, is connected in parallel with the position sensing potentiometer 255 via lines 305 and 306 and both are energized by an AC transformer 308 connected to lines 305 and 306 to provide a six volt input. The sliders 300' and 255' of each of the potentiometers are connected to inputs 270, 271 of the comparator 240. Slider 300' has been prepositioned to provide a portion of the six volt signal corresponding to a desired radial position of the back stitcher 72. Slider 255' is moved with the back stitcher 72 radial motion and provides a portion of the six volt signal to terminal 271 of the comparator. Contacts 4MF2 and 4MR2 are interlocks to prevent simultaneous operation of relays 4MR and 4MF. As mentioned previously, limit switches 256 are built into the position sensor 250 to prevent overrunning of the potentiometer 255 by opening and causing de-energization of relays 4MR and 4MF when the full extent of travel of the potentiometer 255 has been reached. Contacts 8CR1, 2 are contacts of the stitcher tool interlock relay and prevent operation of any of the stitcher motions from the comparators 240–243 when not in the automatic mode. In addition, limit switches may be mounted on the machine itself and electrically connected in series with relays 4MF and 4MR to prevent overrunning and damage to the machine.

As has been mentioned previously, each of the comparators 240–243 is an independent circuit controlling a particular motion on the machine tool. Three of the comparators 240, 242, 243 act in combination to control the back stitcher 72 motion. Thus rotary, radial, and traverse or axial movements of the back stitcher 72 may be independently energized or may be energized concurrently to perform a contouring motion for the back stitcher. The other comparator 241 controls the motion of the lower stitcher 34. The timing and sequence of operation of these circuits is under control of the tape reader control system.

The remainder of the positioning control on this machine tool is in an open loop mode whereby a relay is energized, causing movement of a particular element of the machine tool until a limit switch is activated to interrupt the relay and cause the element to stop. Thus for example, the tailstock forward relay 7MF is connected across the power lines in series with the manually operated tailstock switch 310, the tailstock limit switch 312, and an interlock contact 7MR1 of the tailstock reverse relay 7MR. A tape reader relay contact T69 is connected in parallel with the manually operated switch 310, and when either is closed, energization of relay 7MF will occur, causing its contacts to operate. The closing of contacts 7MF1 applies power to the tailstock motor 213, creating a forward movement of the tailstock assembly 4 toward the drum D. Movement continues in this open loop mode until tailstock limit switch 312 is opened by the tailstock assembly reaching the desired position. At this time, relay 7MF will be de-energized to open contacts 7MF1 and remove the tailstock motor from the source of power. When the tailstock assembly 4 is moved away from this position under the control of the tailstock reverse relay 7MR, limit switch 312, will again close, preparing the circuit for the energization of relay 7MF for later operation.

The remainder of the circuitry shown in FIG. 21 consists of other control relays and solenoid valves which are energized by control relay contacts, manual switches, or tape relay contacts for controlling the application of pneumatic pressure to the lower and back stitcher tools, bead setter mechanisms, tailstock assembly, etc. Duration of operation of these elements is important in the sequence of operation of the tire building machine 1 and is under control of the tape reader system.

TAPE READER

Referring now to FIG. 23, there is shown a generalized schematic diagram of the tape reader and means for transferring the information obtained from the tape 320 to storage relays TS1–TS82. The tape reader operates in a step-by-step manner to advance the tape 320 to a new position upon command from the control circuitry to be more fully described later. Advancement of the tape reader drum 321 is accomplished by a continuously running motor M which is coupled to the tape drum 321 to index the same through a magnetic clutch CL which is energized by the control circuitry. An index cam 335 is mounted to turn with the drum 321 to actuate microswitches CL1, CL2 at appropriate positions in its rotation. A conventional gear reduction unit (not shown) may be located between the cam 335 and the tape drum 321 to provide one step of advancement of the tape on the tape drum for every complete rotation of the cam. The tape drum 321 is made of a conductive material and is connected by way of lead 322 to one side of a power line. A bank of eighty two brushes 323 is mounted in fixed relation with the tape drum 321 so that each brush corresponds with one channel of the tape 320. Each of the brushes 323 is connected to its associated storage relay TS1–TS82 by way of a cable, and each of the relays is connected to the other side of the power line. Thus, as holes in the tape 320 appear at the reading station in any number of channels, the pick-up brushes 323 will contact the drum 321 to complete the circuit and cause energization of the appropriate relays. Since the tape drum 321 remains in this position until commanded to move to its next position by the tape control circuitry, the appropriate storage relay TS1–TS82 will remain energized during this interval. Each storage relay has a plurality of contacts, identified by the letter T followed by the number of the relay, located in the control circuitry to control energization of the various solenoids, relays, and controls affecting machine operations as well as the tape reader control circuitry.

SEQUENCING CIRCUITRY

Automatic control of the tire building machine is accomplished by tape control of the various cycles in the sequence of operations. In this control system an endless tape 320 is utilized which is carried about an indexable drum 321 under control of the tape reader circuitry shown in FIG. 22. By utilizing pre-punched tapes it is possible to change the programming for any given tire size simply by selecting and mounting the desired tape. In the machine described, the tape format provides for 82 channels or reading stations transversely oriented on the tape, each being allocated to a specific operation or function of the machine or to specific portions of the control circuitry. It is an easy matter to perforate the tape in any desired configuration so that each operation of the machine occurs automatically in a timed sequence. The tape reader and associated circuitry are located in the program control enclosure and are easily accessible to the operator.

Basically, the tape reader operates in a step-by-step manner in the automatic control mode, the steps usually being equally spaced in time by a built-in timer control. However, the tape 320 may be controlled in different ways and it will be shown that the tape can be controlled at different timing intervals or upon completion of a particular positioning function or by manual control. The schematic diagram, FIG. 22, is a somewhat simplified control circuit for the tape reader, but it is sufficient to describe the various operations thereof.

The normal operation of the tape reader control is in automatic cycle when the relay AR has been energized. Line 325 is connected to line 326 through contacts AR1 of the relay AR to place line 325 at the same potential as line 326. When the cycle start push button 328 is pressed, power is applied to energize relay 3CR through the normally closed contacts 9CR1. Power from line 327 is applied through the now closed contacts 3CR1, through the normally closed contact L1 to energize relay P, since the clutch contact CL1 is closed being in the rest position to complete the circuit. Relay contacts P1 close to lock in contacts CL1 and contact P2 closes to cause energization of the magnetic clutch CL and movement of the common contact drum 321 together with clutch contacts CL1 and CL2. When contact CL2 closes, power is applied from line 327 through the normally closed switch 330 of the manual tape advance switch 331 to energize relay L. Contact L2 closes to lock in energization of the relay L, contact L1 opens to drop out relay P, contact L3 closes to energize relay 1CR, and contact L4 opens to de-energize the magnetic clutch CL. Although the magnetic clutch is de-energized, movement of the drum 321 continues until contacts CL1 and CL2 reach their rest positions shown in FIG. 22, thereby preparing the circuitry for the next tape advance. The motor M of the tape reader is continually operative, being connected across lines 327 and 276 by way of line 333.

Energization of the magnetic clutch CL serves to couple the motor M to the common contact drum 321 and to the cam discs 335 which rotate with the drum 321 for operating contacts CL1 and CL2. Relay L will remain energized, holding the circuit in its new position until contact 3CR1 opens by de-energization of relay 3CR by releasing the cycle start push button 328. When relay L drops out, contact L3 opens, causing de-energization of relay 1CR, and an opening of contacts 1CR1 which initiates the one-second time interval of relay 2TR. After the one-second time delay, contact 2TR closes, causing energization of relay 3CR from line 325 through normally closed contacts 9CR2 and the contact 2TR1. Relay contact 2TR1 remains closed for only a short interval of time, sufficiently long, however, to cause energization of relays 3CR, P, and L, and a subsequent rotation of the contact drum 321 of the tape reader to its new position. When relay contacts 2TR1 again open, relays 3CR, P, and L de-energize, along with relay 1CR to cause initiation of another one-second interval.

Since relay 2TR is connected directly across the line, the relay continues to close its contacts for a short interval at one-second intervals as long as contact 1CR1 is closed. Relay 1CR is provided to interrupt the continuation of the cycle of relay 2TR when relay L is energized, thereby providing a lock function to prevent multiple advances of the tape reader when the step tape pushbutton 328 has been manually closed. During the automatic cycle, the tape 320 continues to step one step at a time at one-second intervals determined by relay 2TR unless interrupted by the energization of relay 9CR. As can be seen in FIG. 22, the energization of relay 9CR is caused by the closure of any one of a plurality of tape relay contacts or combination of tape and stitcher movement relay contacts shown generally at 335. These include the drum expand and collapse contacts T55, T56, the bead ring tape contact T61, the one-revolution solenoid tape contact T66, the cement or gas time tape contacts T72, T73, and the lower stitcher movement relay contacts 3MF3 and 3MR3, in addition to the back stitcher relay contacts T63, T64, T65, in combination with the back stitcher movement relay contacts 2MF3, 2MR3, 4MR3, 4MF3, 5MF3, 5MR3. It is seen that back stitcher tool 72 positioning will energize relay 9CR only when selected by tape storage relays TS63, TS64, and TS65. This allows these tools to be pre-positioned without interfering with the automatic cycle when so desired. Thus, when any one of these contacts or combination of contacts has been closed to energize relay 9CR, the open contact 9CR2 in the tape reader advance circuitry will prevent movement of the tape reader drum 321 until the controlling function has completed its movement or the contact 3TR1 is closed to cause the tape reader to step to a new position, thereby releasing tape storage relays and the tape contacts holding relay 9CR energized. Relay 3TR is a variable delay timing relay wherein any one of a plurality of time intervals pre-set by potentiometers shown generally at 336 may be selected by the closure of appropriate contacts of the tape reader control system. In this particular circuit arrangement, the same tape reader relays which directly caused energization of relay 9CR also directly or indirectly select a specified time interval for delay of the timing relay 3TR.

Thus contacts T55a, T56a, T61a, T72a and T73a connect a preset potentiometer to control the time interval of relay 3TR and contacts T55b, T56b, T61b T72b and T73b together with contact 2TR2 initiate actuation of relay 3TR. Upon closure of the contact 3TR1 and closure of the contact 2TR1, relay 3CR will be energized to initiate another cycle of the tape reader.

Thus it is seen that the tape reader circuitry causes stepping of the tape reader drum 321 at approximately one-second intervals creating the various machine operations in a desired sequence unless the tape control circuitry is interrupted by the 9CR relay to provide a longer time interval. This may be required for certain operations which necessitate manual intervention by the operator or for operations where a longer time is needed for properly positioning the tools. Additionally, it is noted that a contouring function of the back stitchers 72 can be created by simultaneously energizing the controls for radial, rotary, and traverse back stitcher motions or alternatively, energizing any one or more of them in any desired sequence at various time intervals, and causing the tape reader to hold off advancing to its next position until any desired back stitcher motions are completed. Still further, it will be noted that small time delays can be provided in the sequence by programming two or three identical steps in sequence without energizing relay 9CR.

Thus far it has been shown how the tape reader control operates in a manual or automatic step-by-step manner. Additionally, it is possible to cause a rapid advance of the tape reader to any desired position without causing the machine functions to be operative. Such a feature is useful when it is desired to start the automatic cycle at some point other than at the beginning of the cycle or at the completion of the cycle to rapidly advance the tape to the start position. Fast advance relay 2CR may be energized by manually depressing switch 331 or calling for tape relay contact T81, since the manual-automatic switch 338 is in the closed position. Contacts 2CR1 are in parallel with contacts 3CR1 and cause energization of relay P and a subsequent closing of contacts P2, which in turn energize the magnetic clutch CL. Normally closed contacts 2CR2, having opened, prevent energization of relay L and an interruption of energization of the magnetic clutch. The tape reader will continue its fast advance until de-energization of relay 2CR by a tape reader contact interrupting relay AR or by the release of the manual switch 331.

Referring now to FIG. 24, there is shown a generalized schematic circuit diagram of the analogue position control circuitry for controlling one motion of a stitcher tool. Although portions of this circuit are shown in FIG. 21, they are repeated here to show a complete circuit for ease of understanding. This circuit covers the closed loop analogue control system for the back stitcher radial motion and shows how the command potentiometers 300–303 are compared with the feedback potentiometers 255 in a comparator circuit 240 to control the stitcher movement relays 4MF, 4MR and thus the movement of the stitcher tool 72. The command potentiometers are located in the control cabinet and each consists of a precision ten-turn potentiometer, rotated by a knurled knob 340 (FIG. 24a) to move the variable slider, 300'–303' of the potentiometer. Indicia-bearing dials 300"–303" are mounted on each potentiometer and as each variable slider is moved, indicator hands 342 move across the face of each indicia dial to record the position of the slider. Thus, once a particular position of the command potentiometer has been attained and the position recorded, this same position can be reached at some later time merely by turning the knurled knob until the indicator hands reach the appropriate portion of the dial. For the radial motion of the back stitcher, there are provided 16 command potentiometers although only four are shown in FIG. 24. These potentiometers provide 16 pre-set positions for the back stitcher radial motion, any of which may be selected under command of the tape reader by energizing the appropriate channel. The resistances of each potentiometer 300–303 are connected in parallel and are energized by the secondary winding of a six-volt transformer 308. Thus, the slider 300'–303' of the potentiometer picks off a portion of this applied voltage. Each of the sliders 300'–303' of the potentiometers 300–303 is connected through contacts T13–T28 to input 270 of comparator 240, the contacts corresponding to particular tape storage relays TS13–TS28. Thus, it may be seen that if a hole is punched in the tape 320 at any one of these 16 channels, the corresponding storage relay will be energized to close its contact and connect the appropriate potentiometer slider to the input 270 of the comparators 240.

Also shown in the circuit is a feedback potentiometer 255 which is located on the machine tool and whose slider 255' is mechanically coupled to the drive system for the radial motion of the back stitchers. The slider 255' of the feedback potentiometer 255 is so coupled that it completes one traverse of the potentiometer 255 for the full extent of motion of the back stitcher. The feedback potentiometer 255 receives its energization from the same transformer 308 which supplies voltage to the command potentiometers 300–303. Thus, as the back stitcher 72 moves in a radial direction, it will cause the slider 255' of the feedback potentiometer 255 to traverse the resistive element of the potentiometer 255 to provide an output voltage, corresponding with the position of the back stitcher. This voltage then provides the second input to the comparator 240, the slider 255' being electrically connected to the input terminal 271 of the comparator 240.

TOOL SET-UP

An important feature of the automatic control system just described is the variability in programming and tool set-up available to the operator. As previously mentioned, once a tape has been programmed and the position control potentiometer readings recorded, this information may be stored and utilized at any later time. The tape may be placed on the machine and the position control potentiometers set to correspond with recorded information so that the various machine functions will automatically attain the correct starting position without any manual intervention by the operator. However, when it is desired to program a new tape for a different tire size, it will be necessary to re-define the lower and back stitcher positions at various intervals throughout the cycle and it is for this purpose that the following options are available to the operator for tool set-up.

In the manual mode, the various stitcher tools may be jogged into position by depressing jog switches 262 to cause either forward or reverse direction of movement of the tools. Similarly, the operation of various other functions of the machine, such as the chafer or tail-stock drive motions, may be actuated under manual control. When a desired position is reached, an appropriate limit switch on the machine tool itself may be adjusted to reflect this position, or since the feedback potentiometer 255 on the stitcher tools are reflecting this position, the position of the command potentiometers may be set to correspond with the setting of the feedback potentiometers 255 at the desired position. This may be accomplished by connecting a jumper cord 350 (see FIGS. 21 and 22) normally connected to socket 351, to the desired comparator relay 240 so that it indicates a comparison by the visual indicator lamps 280, 281 while not causing energization of the associated stitcher movement relays, due to the open contacts 8CR1, 8CR2. With the comparator unit 240 operative, the command potentiometer 300 may now be rotated until both indicator lamps 280, 281 are extinguished, indicating that a comparison has been reached. The dial reading 300'' of the command potentiometer 300 is now an indication of the position of the feedback potentiometer 275 and thus of the particular stitcher tool, which information may be recorded for future utilization. By following this procedure the entire set-up for a tire may be easily made. Provided that no change in the relationship of the mechanical elements of the machine tool takes place, these settings will be repeated accurately during the cycle of building a tire, and whenever such a cycle is repeated at some later date.

Another and faster method for setting up the machine tool can be made on the stitcher tools by energizing the proper relay and adjusting with the control in the "on" position, i.e., with contacts 8CR1, 8CR2 closed. In this mode, the comparator 240 will actuate the appropriate stitcher movement relays 4MF, 4MR whenever there is an unbalance in the comparator 240. The sequencing circuitry will be inoperative since the jumper 350 will be removed from the socket 351. In this dynamic set-up mode only the appropriate command position potentiometer need be moved by the operator, thereby causing an unbalance in the corresponding comparator and energization of the appropriate stitcher movement relay to cause the stitcher tool to move to alleviate the unbalance. Thus, the stitcher tool "follows" the movement of the command potentiometer under direction of the operator and may be readily moved to its desired position. A record of the command potentiometer indication at the final position may then be retained for future programming purposes.

As pointed out previously, the null range of the comparators 240–243 is variable and may be broadened out so that a null condition is indicated for larger differences between command and position feedback voltages. This feature is useful in that it provides a measure of control over anticipatory stopping of any of the stitcher tools. Thus, because of the inertia of the drive system an early indication of comparison will de-energize the drive, allowing the stitcher tool to coast to an end position. By determining the amount of coasting in a given drive and utilizing the anticipatory stopping, extremely accurate and repeatable end positions can be realized.

TYPICAL SEQUENCE OF OPERATIONS

Now that the mechanical and automatic control operations of the machine have been described, a more thorough understanding of the operation of this machine may be obtained by the following description of a typical sequence of operations for a portion of a tire building cycle through ply down, bead set, pull out, turn-up and ply-lock of the first band as called for on a typical tape program.

The cycle is initiated by depressing push button 361, energizing relay AR and thereby energizing the remainder of the control circuitry for automatic operation. Tape start switch 328 is closed, causing the tape reader to step to its first position whereat the back stitcher tools 72 are commanded to move to an idle station in the event that they are not already located at such a station. Also at this first position, a tape channel is read to make contact T74, interrupting relay AR and causing the electronic control circuitry to be de-energized, thereby preventing further advance of the tape reader. When the tape start switch 328 is again depressed, the tape reader will advance to the second position whereat tape contact T55 is read, causing energization of a relay and a pneumatic-control solenoid which applies air pressure to the tire-building drum D causing the drum to expand. Contact T55 also energizes relay 9CR which opens its contact 9CR2 to interlock further advance of the tape reader for a specified time period. Contact T55a in the circuit of the timing relay 3TR has selected a preset interval of time before the contact 3TR1 in the advance relay circuit closes to energize relay 3CR and cause the tape reader to step to the third position at which channels 53 and 72 of the tape reader are read. Contact T53 energizes relay MIS to start drum rotation at an intermediate speed by the closure of contacts MIS1 in the drum motor 201 control circuit. Contact T72 energizes relay 9CR and again interrupts further advance of the tape reader until the time interval selected by contact T72 in the time relay 3TR circuitry has elapsed. Such time interval has been pre-adjusted by the setting of potentiometers shown generally at 336 to allow sufficient time for each particular machine operation to take place, in this case applying cement to the drum. At the completion of this time period, contacts 3TR1 close to energize relay 3CR advancing the tape reader to the fourth position, but since no information is recorded in this position, the contacts 2TR1 close after a one-second pulse delay to cause a stepping to the fifth tape position at which there is a reading of channel 74 and a de-energization of relay AR to interrupt the cycle. When the cycle is restarted, the drum D collapses under control of similar relay circuitry and subsequently, in tape position 8, the cycle stops again for placement of the first band P1 in the form of an elongated cylinder built up of any desired number of ply stock. After the band P1 is placed in position by the operator, the cycle is restarted most conveniently by a foot switch. At tape position 9 the drum expands within the band and subsequently, at position 11, the cycle stops while the operator spins the band into place.

Again upon restarting the cycle, the tail stock assembly 4 moves forward (via tape contact 69, relay 7MF and contacts 7MF1 to operate tailstock motor 213), a lock pin (not shown) engages, and the support tube 16 moves into position over the drum shaft 6. The drum D is then caused to rotate forward at low speed (via relay MF, contacts MF1, tape contact T52, relay TR which effects dynamic braking on drop-out, relay MLS and contacts MLS1 to operate drum motor 201) and the lower stitcher tools 34, with air applied, are moved axially apart at low speed from the pre-set position of FIG. 1 to cause initial turn down or "break-over" of the ends of the band. This pre-set position of the lower stitchers 34 is provided by the reading of tape channel 46 at station 11, which selects one of ten pre-set position command potentiometers for the lower stitchers and connects it into the circuit with the position feedback potentiometer 251 to cause an unbalance of comparator 241 and energization of either relay 3MF or 3MR to create axial movement of the lower stitchers to such pre-set position. When reached comparator 241 will be nulled, causing deenergization of the movement relays 3MF or 3MR.

At tape position 13, the pre-set command potentiometer corresponding to an outward position of the lower stitcher 34 is selected by tape channel 47 and connected to comparator 241. The comparator 241 is then unbalanced, closing its contact 274 and energizing relay 3MF through the stitcher tool interlock relay contacts and normally closed contacts 3MR2. Outward movement of the lower stitcher 34 continues until a null condition in comparator 241 is again attained. As provided in a typical tape sequence, identical commands may be programmed, and here have been programmed for tape steps 13 through 15 to cause three steps of the tape reader in response to the time control of relay 2TR and thus a consequent three-second time delay sufficient for the lower stitcher tools 34 to reach the end of their movement. Upon reaching the limit of travel for "break-over," the lower stitcher tools stop and, with air pressure off, drop away from the band due to gravity.

Now at tape position 16, the back stitcher tools 72 with air on to apply pressure to the stitcher tools begin their rotary movement under the direction of tape channel 9, which has selected a command potentiometer for comparison with the back stitcher rotary position potentiometer 252 in comparator 242. Prior to the limit of desired rotary travel, radial inward travel of the back stitcher tools 72 begins. In the tape sequence, this concurrent rotary and radial movement occurs at tape position 17 by selection of tape channels 10 and 17.

As rotary travel stops, traverse travel of the back stitcher tools 72 in an axial direction away from each other is initiated at tape position 18 as selected by tape channel 31 to unbalance comparator 243. Previously, at position 16, tape channel 63 had been also programmed to energize relay 9CR as long as the rotary motion of the back stitcher was operative. Upon completion of this motion, relay 9CR will drop out by the opening of contacts 2MF1 or 2MR1, closing contacts 9CR2 and energizing erlay 3CR to advance the tape reader. In tape reader position 17, even though both rotary and radial motion have been selected by tape channels 10 and 17, it will be noted that only tape contact 63 has been effective to energize relay 9CR to hold off advance of the tape. Thus, even though both movements occur simultaneously, it is only when the rotary movement has reached its end position that contacts 2MF1 or 2MF1 will open, deenergizing relay 9CR and causing advance of the tape reader to position 18. In the latter position, there is a simultaneous movement of the radial and traverse motions for the back stitchers 72 with advancement of the tape being dependent only upon the completion of the radial motion. Thus, it is seen by this sequence of tape reader steps that it is possible to energize the back stitchers 72 in any combination of its three movements or in any sequence of combinations of movements to perform a contouring function. The various positions through which the stitcher tools 72 are moved with the drum D rotating forward at low speed to effect plydown of the first band P, are illustrated in FIG. 12. In the last position, the drum rotation is reversed (by tape contact T51, relay MR and contacts MR1) to complete the first plydown operation. Thereafter, the tools 72 are reset to idle position by suitable commands for the next automatic operation and the cycle is stopped.

Upon restarting the cycle, the bead set, bead stitcher, pull-out, and turn-up operations are accomplished automatically and without interruption through intermittent advancement of the tape reader in a manner similar to that previously described. Thus, first the bead setter mechanisms 12 and 15 with first beads B1 disposed on the respective bead placement rings 143 are moved into contact with the ends of the drum D as shown in FIG. 8 by high pressure air to set the first beads B1 in place, after which the bead setter mechanisms are retracted. The drum D is then rotated forward at intermediate speed (tape contact T35, relay MIS and contacts MIS1) and the back stitcher tools 72 are caused to rotate into contact with the beads and medium air pressure is applied. Thereafter, the back stitcher tools 72 are moved radially outwardly as shown in FIG. 13 to stitch the beads B1 to the first band P1.

Next the bead setter mechanisms 12 and 15 are moved in by low pressure air to position the pull-out mechanisms 13 inside the drum, as also shown in FIG. 8, and the drum rotation is increased to high speed (tape contact T54, relay MHS and contacts MHS1), causing the band B1 to flare by centrifugal force. Then the bead setter mechanisms 12 and 15 are withdrawn to retract the pull-out rings 161 by engagement of the fingers 165 with the sleeve 164, thereby causing the band P1 to turn outwardly. The back stitcher tools 72 are moved into the radial innermost position of FIG. 14 for turn-up of the band ends. At the proper time, air pressure is applied to the tools 72 to cause them to swing inwardly centered on the beads B1, and the inner and outer stitching discs 122, 121 are extended. Now the tools 72 are rotated to carry the tools around the bead proper and their movement is halted while the drum D rotation is reversed and dropped from high to intermediate speed. Rotation of the tools about the bead proper is then continued to a pause point where the drum rotation is again reversed.

Figure 16:
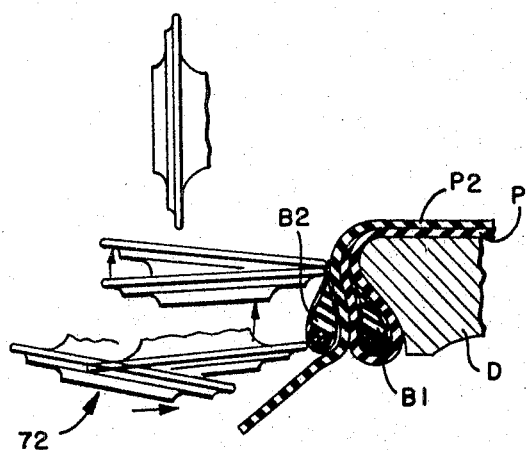
Figure 17:
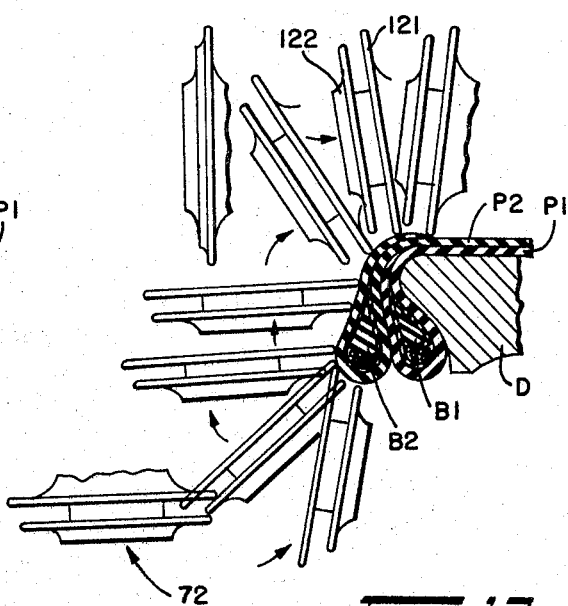

Rotary travel of the tools 72 around the bead proper is then completed, after which the tools are moved simultaneously radially and axially outwardly. Upon completion of such radial and traverse travel, the tools are rotated into the final position of FIG. 14 for completion of turn-up. Now the tools 72 are caused to traverse the face of the drum D with the tools extended for the final stitching or ply-lock of the first band P1. Afterwards, the back stitcher and lower stitcher tools 72 and 34 are moved to idle positions and the tail stock assembly 4 retracted to permit placement of the second band P2 around the first band followed by ply-down, bead set, pull-out, turn-up, and ply-lock of the second band as schematically illustrated in FIGS. 16 and 17. Since these operations to be performed on the second and subsequent bands are substantially identical to those carried out on the first band just described, no further discussion is thought to be necessary.

Figure 18:
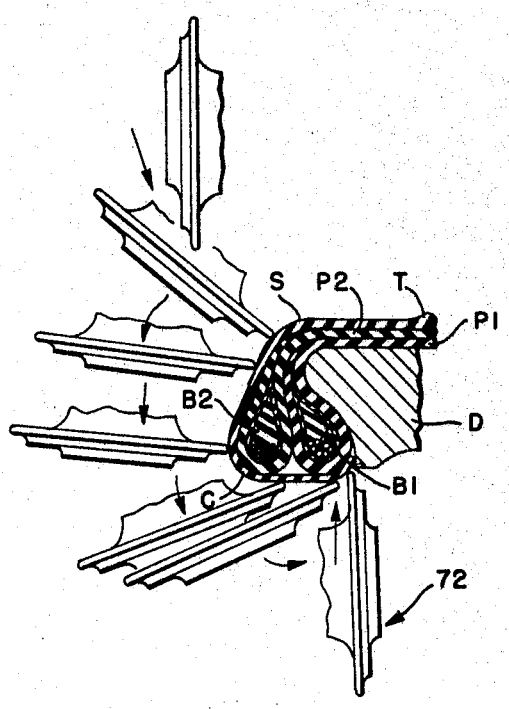
Figure 19:
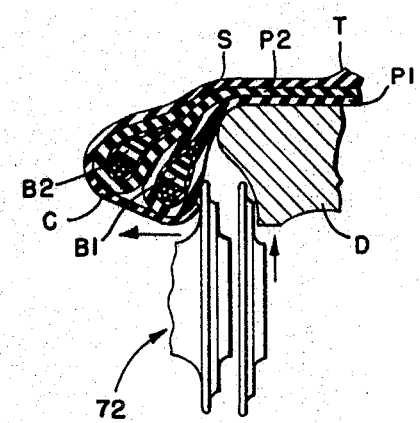

When the desired number of bands are in place, the chafer strip C, side wall stock S, and tread stock T are applied on the outer band B2 as shown in FIG. 18 and the ends of the chafer strip C are tucked in between the first bead B1 and drum shoulder through appropriate rotary, radial, and traverse movements of the back stitcher tools 72, as further illustrated in FIG. 18. Thereafter, the stitcher tools 72 are wedged in between the first band B1 and drum shoulder as shown in FIG. 19 and moved axially outwardly to strip the ends of the tire carcass T from the drum shoulders. Finally, the drum D is collapsed and the tail stock assembly 4 retracted to permit removal of the carcass. If desired, the lower stitchers 34 may be brought into engagement with the underside of a finished green tire to assist in supporting the same when the drum is collapsed.

Upon removal of the tire carcass from the drum, it is transported to a tire vulcanizer that is operative in known manner to deform the carcass to tire shape and vulcanize the same.

We therefore, particularly point out and distinctly claim as our invention:

1. A tire building machine comprising a cylindrical drum adapted to receive tire plys with the ends thereof extending substantially beyond the ends of said drum, ply turn-down means for turning the ply ends down over the ends of said drum, bead setting means operative to place tire beads against the ends of said drum with the turned down ply ends between the beads and drum ends, ply turn-up means for turning such ply ends upwardly over such beads and firmly pressing such turned up ends against said drum, position feedback means for indicating the instantaneous positions of said ply turn-down means and ply turn-up means, preposition control means for indicating desired positions for said ply turn-down means and ply turn-up means, a position comparator for said position feedback means and preposition control means to interrupt movement of said ply turn-down means and ply turn-up means when such desired positions are reached, and programmer means operative to select the sequence in which said preposition control means are to be compared with said position feedback means for controlling the sequence and movement of said ply turn-down means and ply turn-up means, said ply turn-down means and said ply turn-up means comprising ply engaging tools, and said preposition control means and said position feedback means comprising multi-turn potentiometers, said potentiometers for said feedback means being mechanically coupled to said tools to provide an analog indication of the actual positions of said tools, and said potentiometers for said preposition control means being manually adjustable to provide an analog indication of the desired end positions of said tools.

2. A tire building machine as set forth in claim 1 wherein said ply turn-up means comprises back stitchers, means mounting said back stitchers for movement both axially and radially of said drum as well as rotatably around the ends of said drum, a single position feedback means for each of such back stitcher movements, and plural preposition control means for each of said back stitcher movements which are selected by said programmer means in a desired sequence for controlling each such movement.

3. A tire building machine as set forth in claim 1 wherein said ply turn-down means comprises lower stitchers, means mounting said lower stitchers for movement axially and radially of said drum, a single position feedback means for such axial lower stitcher movement, and plural preposition control means for each of such lower stitcher movements which are selected by said programmer means in a desired sequence for controlling each such movement.

4. A tire building machine as set forth in claim 3 wherein said means mounting said lower stitchers for movement as aforesaid is operative to move said lower stitchers into engagement with the underside of a finished green tire on said drum to assist in supporting the same when the drum is collapsed for ease of removal of such tire from said drum.

5. A tire building machine comprising a rotatable drum and a plurality of stitching tools operative to form a green tire on said drum, drive means for said tools operative to move the latter to form such green tire, position feedback means for each of said tools, preposition control means for each of said tools, a position comparator for said position feedback means and said preposition control means, and programmer means operative to select in sequence said preposition control means to be compared with said position feedback means and thus control the movement of said tools, said preposition control means and said position feedback means comprising multi-turn potentiometers, said potentiometers for said feedback means being mechanically coupled to the drive means for said tools to provide an analog indication of the actual positions of said tools, and said potentiometers for said preposition control means being manually adjustable to provide an analog indication of the desired end positions of said tools.

6. A tire building machine as set forth in claim 5 wherein said stitching tools include lower stitchers and back stitchers, and said drive means includes means to move said lower stitchers axially of said drum, and said back stitchers axially and radially of said drum as well as around the ends of said drum, and a single position feedback means for each of such movements of said tools.

7. A tire building machine as set forth in claim 5 wherein said programmer means includes a plurality of tape positions for controlling the movements of said tools as aforesaid, and means responsive to time signals and signals from said position comparators to move from one tape position to the next.

8. The tire building machine as set forth in claim 5 wherein there are a plurality of said preposition control means for each of such tool movements which are selected by said programmer means in a desired sequence for controlling each such movement.

9. A tire building machine comprising a cylindrical drum adapted to receive tire plys with the ends thereof extending substantially beyond the ends of said drum, first stitcher means for breaking the ply ends down over the ends of said drum, second stitcher means for stitching plys to the contour of said drum, and bead setting means operative to place tire beads against the ends of said drum with the turned down ply ends between the beads and drum ends, said second stitcher means also being operative to turn such ply ends upwardly over such beads and firmly pressing such turned up ply ends against said drum, said second stitcher means comprising back stitchers, and means mounting said back stitchers for movement both axially and radially of said drum as well as rotatably around the ends of said drum, said means mounting said back stitchers for radial movement comprising stitcher carriages mounted on horizontal support shafts extending parallel to the axis of said drum, links pivotally supporting said support shafts and thus said carriages for swinging movement in a generally radial direction toward and away from said drum, a radial drive shaft fixed against rotation and mounted for vertical pivotal movement about an axis parallel to the drum axis, a coupling carried by said support shafts in threaded engagement with said radial drive shaft, and a radial drive motor also carried by said support shafts and adapted to rotate said coupling in opposite directions for effecting such radial movement of said carriages in opposite directions.

10. A tire building machine comprising a cylindrical drum adapted to receive tire plys with the ends thereof extending substantially beyond the ends of said drum; first stitcher means for turning the ply ends down over the ends of said drum, said first stitcher means being carried by a pivoted support for radial swinging movement toward and away from said drum, pneumatic means for yieldably pressing said support toward said drum; said support and thus said first stitcher means being adapted to move by gravity to an inoperative position remote from said drum upon release of said pneumatic means; means for limiting the extent of movement of said first stitcher means toward the axis of said drum, comprising a rod having a fixed pivotal connection extending through a slot in said support and an adjustable stop at the free end of said rod; bead setting means operative to place tire beads against the ends of said drum with the turned down ply ends between the beads and drum ends; and second stitcher means for turning such ply ends upwardly over such beads and firmly pressing such turned up ply ends against said drum.

11. A tire building machine as set forth in claim 10 wherein said first stitcher means are adapted to be brought into engagement with the underside of a finished green tire on said drum to assist in supporting the same when the drum is collapsed for ease of removal of such tire from said drum.

12. A tire building machine comprising a cylindrical drum adapted to receive tire plys with the ends thereof extending substantially beyond the ends of said drum, first stitcher means for turning the ply ends down over the ends of said drum, second stitcher means for stitching such plys to the contour of said drum, bead setting means operative to place tire beads against the ends of said drum with the turned down ply ends between the beads and drum ends, and means adapted to be received within the ends of said drum and withdrawn for pulling the turned down ends of the ply outwardly into firm contact with the beads, said second stitcher means also being operative to turn such ply ends upwardly over such beads and firmly pressing such turned up ply ends against said drum, said ply pull-out means comprising a radially compressed annular coil spring which is adapted to expand to a diameter slightly greater than the inside diameter of the bead upon withdrawal from said drum, a rigid wire extending through said coil spring, a central sleeve, and radial arms connecting said wire to said sleeve, said bead setting means including a plurality of pivoted fingers which are adapted to be swung into engagement with said central sleeve for removal of said coil spring during retraction of said bead setting means.

13. A tire building machine as set forth in claim 12 wherein said bead setting means comprises a pair of inner and outer sleeves, said outer sleeve being of a diameter slightly less than the outer diameter of said drum, said inner sleeve being telescoped within said outer sleeve, a bead placement ring attached to the inner end of said inner sleeve for carrying a bead which is to be coaxially pressed against the adjacent end of said drum, spring means biasing said outer sleeve inwardly beyond said inner sleeve and bead placement ring carried thereby, and means for urging said inner sleeve toward said drum to cause engagement of said drum by said outer sleeve and subsequent relative movement of said inner sleeve with respect to said outer sleeve to bring said bead placement ring into engagement with the outermost ply on the adjacent drum end.

14. A tire building machine comprising a rotatable drum and a plurality of stitching tools operative to form a green tire on said drum, drive means for said tools operative to move the latter to form such green tire, position feedback means for each of said tools, preposition control means for each of said tools, and a position comparator for said position feedback means and said preposition control means, said preposition control means and said position feedback means comprising multi-turn potentiometers alterable in response respectively to manual and controlled tool movements to provide an analog indication of position.

15. A tire building machine as set forth in claim 14 wherein said position comparator includes sensitivity adjustment means for providing anticipatory stopping of controlled tool movements.

16. A tire building machine as set forth in claim 14 further comprising means for jogging said tools to a plurality of desired tool positions to permit setting of desired preposition control means to correspond with the instantaneous settings of said position feedback means at each of such desired tool positions.

17. A tire building machine as set forth in claim 16 further comprising means for selecting the sequence in which said preposition control means are to be compared by said comparator with said position feedback means for controlling such tool movements.

18. A tire building machine as set forth in claim 14 further comprising means for adjusting the setting of said preposition control means for such tool movements to cause movements of said tools until said tools have reached the desired tool positions and there is a balance between said preposition means and corresponding feedback means.

19. A tire building machine comprising a cylindrical drum adapted to receive tire plys with the ends thereof extending substantially beyond the ends of said drum, ply turn-down means for turning the ply ends down over the ends of said drum, bead setting means operative to place tire beads against the ends of said drum with the turned down ply ends between the beads and drum ends, ply turn-up means for turning such ply ends upwardly over such beads and firmly pressing such turned up ends against said drum, position feedback means for indicating the instantaneous positions of said ply turn-down means and ply turn-up means, preposition control means for indicating desired positions for said ply turn-down means and ply turn-up means, a position comparator for said position feedback means and preposition control means to interrupt movement of said ply turn-down means and ply turn-up means when such desired positions are reached, and programmer means operative to select the sequence in which said preposition control means are to be compared with said position feedback means for controlling the sequence and movement of said ply turn-down means and ply turn-up means, said ply turn-up means comprising back stitches, means mounting said back stitchers for movement both axially and radially of said drum as well as rotatably around the ends of said drum, and a single position feedback means for each of such back stitcher movements, said means mounting said back stitchers for axial movement comprising stitcher carriages mounted on horizontal support shafts extending parallel to the axis of said drum, links pivotally supporting said support shafts and thus said carriages for swinging movement in a generally radial direction toward and away from said drum, a radial drive shaft fixed against rotation and mounted for vertical pivotal movement about an axis parallel to the drum axis, a coupling carried by said support shafts in threaded engagement with said radial drive shaft, and a radial drive motor also carried by said support shafts and adapted to rotate said coupling in opposite directions for effecting such radial movement of said carriages in opposite directions.

20. A tire building machine as set forth in claim 19 wherein said axial drive means comprises an axial drive motor carried by said support shafts and operatively coupled to said carriages for moving said carriages axially along said support shafts toward and away from each other.

21. A tire building machine comprising a cylindrical drum adapted to receive tire plys with the ends thereof extending substantially beyond the ends of said drum, ply turn-down means for turning the ply ends down over the ends of said drum, bead setting means operative to place tire beads against the ends of said drum with the turned down ply ends between the beads and drum ends, ply turn-up means for turning such ply ends upwardly over such beads and firmly pressing such turned up ends against said drum, position feedback means for indicating the instantaneous positions of said ply turn-down means and ply turn-up means, preposition control means for indicating desired positions for said ply turn-down means and ply turn-up means, a position comparator for said position feedback means and preposition control means to interrupt movement of said ply turn-down means and ply turn-up means when such desired positions are reached, and programmer means operative to select the sequence in which said preposition control means are to be compared with said position feedback means for controlling the sequence and movement of said ply turn-down means and ply turn-up means, said ply turn-down means comprising lower stitchers, means mounting said lower stitchers for movement axially and radially of said drum, and a single position feedback means for such axial lower stitcher movement, said means for moving said lower stitchers radially of said drum comprising a pivoted support on which said lower stitchers are mounted for swinging movement toward and away from said drum, pneumatic means for yieldably pressing said lower stitchers into engagement with said drum, said lower stitchers being adapted to move to an inoperative position remote from said drum upon release of said pneumatic means, and means for limiting the extent of movement of said lower stitchers toward the axis of said drum comprising a rod having a fixed pivoted connection extending through a slot in said lower stitcher support and an adjustable stop on the free end of said rod.

22. A tire building machine comprising a cylindrical drum adapted to receive tire plys with the ends thereof extending substantially beyond the ends of said drum, ply turn-down means for turning the ply ends down over the ends of said drum, bead setting means operative to place the tire beads against the ends of said drum with the turned down ply ends between the beads and drum ends, ply turn-up means for turning such ply ends upwardly over such beads and firmly pressing such turned up ends against said drum, position feedback means for indicating the instantaneous positions of said ply turn-down means and ply turn-up means, preposition control means for indicating desired positions for said ply turn-down means and ply turn-up means, a position comparator for said position feedback means and preposition control means to interrupt movement of said ply turn-down means and ply turn-up means when such desired positions are reached, and programmer means operative to select the sequence in which said preposition control means are to be compared with said position feedback means for controlling the sequence and movement of said ply turn-down means and ply turn-up means, said bead setting means comprising a pair of inner and outer sleeves, said outer sleeve being of a diameter slightly less than the outer diameter of said drum, said inner sleeve being telescoped within said outer sleeve, a bead placement ring attached to the inner end of said inner sleeve for carrying a bead which is to be coaxially pressed against the adjacent end of said drum, spring means interconnecting said inner and outer sleeve for biasing said outer sleeve inwardly beyond said inner sleeve and bead placement ring carried thereby, and means for urging said inner sleeve toward said drum to cause engagement of said drum by said outer sleeve and subsequent relative movement of said inner sleeve with respect to said outer sleeve to bring said bead placement ring into engagement with the outermost ply on the adjacent drum end.

23. A tire building machine comprising a cylindrical drum adapted to receive tire plys with the ends thereof extending substantially beyond the ends of said drum, ply turn-down means for turning the ply ends down over the ends of said drum, bead setting means operative to place tire beads against the ends of said drum with the turned down ply ends between the beads and drum ends, ply turn-up means for turing such ply ends upwardly over such beads and firmly pressing such turned up ends against said drum, position feedback means for indicating the instantaneous positions of said ply turn-down means and ply turn-up means, preposition control means for indicating desired positions for said ply turn-down means and ply turn-up means, a position comparator for said position feedback means and preposition control means to interrupt movement of said ply turn-down means and ply turn-up means when such desired positions are reached, and programmer means operative to select the sequence in which said preposition control means are to be compared with said position feedback means for controlling the sequence and movement of said ply turn-down means and ply turn-up means, means adapted to be received within the ends of said drum and withdrawn therefrom for pulling the turned down ply ends outwardly into firm contact with the beads prior to ply turn-up, said ply pull-out means comprising a radially compressed annular coil spring which is adapted to expand to a diameter slightly greater than the inside diameter of the bead during such withdrawal.

24. A tire building machine as set forth in claim 23 further comprising a rigid wire extending through said coil spring, a central sleeve, and radial arms connecting said wire to said sleeve, said bead setting means including a plurality of pivoted fingers which are adapted to be swung into engagement with said central sleeve for removal of said coil spring during retraction of said bead setting means.

25. A tire building machine comprising a rotatable drum and a plurality of stitching tools operative to form a green tire on said drum, drive means for said tools operative to move the latter to form such green tire, position feedback means for each of said tools, preposition control means for each of said tools, a position comparator for said position feedback means and said preposition control means, and programmer means operative to select in sequence said preposition control means to be compared with said position feedback means and thus control the movement of said tools, said preposition control means and said position feedback means being multi-turn potentiometers alterable in response respectively to manual and controlled tool movements to provide an analog indication of position.

26. A tire building machine comprising a rotatable drum and a plurality of stitching tools operative to form a green tire on said drum, drive means for said tools operative to move the latter to form such green tire, position feedback means for each of said tools, preposition control means for each of said tools, a position comparator for said position feedback means and said preposition control means, and programmer means operative to select in sequence said preposition control means to be compared with said position feedback means and thus control the movement of said tools, said position comparator being a voltage-responsive, direction-sensitive bridge network having output contacts actuatable to indicate over-voltage, under-voltage, and null conditions.

27. A tire building machine as set forth in claim 26 wherein said position comparator further includes sensitivity adjustment means to extend the null range to provide anticipatory stopping of controlled tools.

References Cited

UNITED STATES PATENTS

| | | | |
|---|---|---|---|
| 2,555,343 | 6/1951 | Jones | 156—402 XR |
| 2,605,197 | 7/1952 | Stevens | 156—402 |
| 2,605,198 | 7/1952 | Haase | 156—402 XR |
| 2,994,024 | 7/1961 | Vanzo et al. | 156—367 XR |
| 3,032,093 | 5/1962 | Nebout | 156—402 |
| 3,031,353 | 4/1962 | Mallory | 156—402 |
| 3,075,570 | 1/1963 | Garver | 156—402 XR |
| 3,165,952 | 1/1965 | Thompson et al. | 318—20.105 XR |

BENJAMIN A. BORCHELT, Primary Examiner

S. C. BENTLEY, Assistant Examiner

U.S. Cl. X.R.

156—402

PO-1050
(5/69)

UNITED STATES PATENT OFFICE
CERTIFICATE OF CORRECTION

Patent No. 3,524,784        Dated August 18, 1970

Inventor(s) Gustaf E. Isaksson, Thomas C. Jones, Ernest S. Ulm, Herbert G. Haas

It is certified that error appears in the above-identified patent and that said Letters Patent are hereby corrected as shown below:

The assignee AMK Subsidiary Corp. should be changed to -- NRM Corporation--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents